United States Patent [19]
Thai

[11] Patent Number: 5,666,528
[45] Date of Patent: Sep. 9, 1997

[54] SYSTEM AND METHODS FOR OPTIMIZING DATABASE QUERIES

[75] Inventor: Lam H. Thai, San Jose, Calif.

[73] Assignee: Borland International, Inc., Scotts Valley, Calif.

[21] Appl. No.: 664,961

[22] Filed: Jun. 13, 1996

Related U.S. Application Data

[63] Continuation of Ser. No. 544,679, Oct. 18, 1995, Pat. No. 5,560,005, which is a continuation of Ser. No. 85,214, Jun. 30, 1993, abandoned.

[51] Int. Cl.$^6$ .................................................. G06F 17/30
[52] U.S. Cl. .......................... 395/613; 345/611; 345/603
[58] Field of Search ............................ 395/600, 613, 395/603, 611; 364/715.08

[56] References Cited

U.S. PATENT DOCUMENTS

| | | | |
|---|---|---|---|
| 3,810,115 | 5/1974 | Stafford | 364/715.08 |
| 4,383,304 | 5/1983 | Hirashima | 364/715.08 |
| 4,509,144 | 4/1985 | Palmer et al. | 364/715.08 |
| 4,606,002 | 8/1986 | Waisman et al. | 395/603 |
| 4,811,199 | 3/1989 | Kuechler et al. | 395/603 |
| 4,817,036 | 3/1989 | Morita | 395/601 |
| 4,872,128 | 10/1989 | Shimizu | 364/715.08 |
| 5,204,958 | 4/1993 | Cheng et al. | 395/613 |
| 5,257,365 | 10/1993 | Powers et al. | 395/611 |
| 5,263,167 | 11/1993 | Conner, Jr. et al. | 395/604 |
| 5,265,244 | 11/1993 | Ghosh et al. | 395/601 |
| 5,265,246 | 11/1993 | Li et al. | 395/604 |

FOREIGN PATENT DOCUMENTS

WO 92/06440 4/1992 WIPO.

OTHER PUBLICATIONS

*Turbo Database Toolbox Owner's Handbook*, Appendix B, B+ Tree Structure, pp. 131, Third Edition, Sep. 1985.

Freeland, R., *Exploring MDXs*, Data Based Advisor, Feb. 1991, pp. 85–87.

Baker, M., *B–tree Indexing: A look at indexing tradeoff in dBASE, Clipper, and FoxPro*, Programmer's Journal, vol. 8.6, Nov./Dec. 1990, pp. 42–46.

Ashany, Ron, *Application of Sparse Matrix Techniques to Search, Retrieval, Classification, and Relationship Analysis in Large Data Base Systems*—SPARCOM, Fourth International Conference on Very Large Data Bases, West Berlin, Germany, Sep. 13–15, 1978, pp. 499–516.

Hamilton, INSIDE ADABAS, WH&O International, copyright 1991, Chapter 3: "The ADABAS Associator," pp. 27–36, and Chapter 6: ADABAS Commands, pp. 49–65.

*Rushmore's Bald Spot*, DBMS, vol. 4, No. 10, Sep. 1991, p. 58.

Douglas Comer, *The Ubiquitous B–Tree*, Computing Surveys, vol. 11, No. 2, Jun., 1979, pp. 121–137.

*Primary Examiner*—Thomas G. Black
*Assistant Examiner*—Paul R. Lintz
*Attorney, Agent, or Firm*—John A. Smart; David N. Slone

[57] ABSTRACT

System and methods are provided for optimizing the access of information, particularly in response to ad hoc queries or filters. The system of the present invention includes a computer having a memory and a processor, a database for storing information in the memory as field values in a record, an indexing component for referencing a plurality of records by key values of the field(s), an input device for selecting desired records by entering a filter (query) condition corresponding to values stored in the field(s), and an optimization module for providing rapid access to the desired records. The optimization module employs one or more existing indices for optimizing data access, including using ones which do not directly support the filter expression. In instances where no indices are available, the optimization module may employ a "learned" optimization method of the invention for on-the-fly learning of records which meet the filter condition.

10 Claims, 19 Drawing Sheets

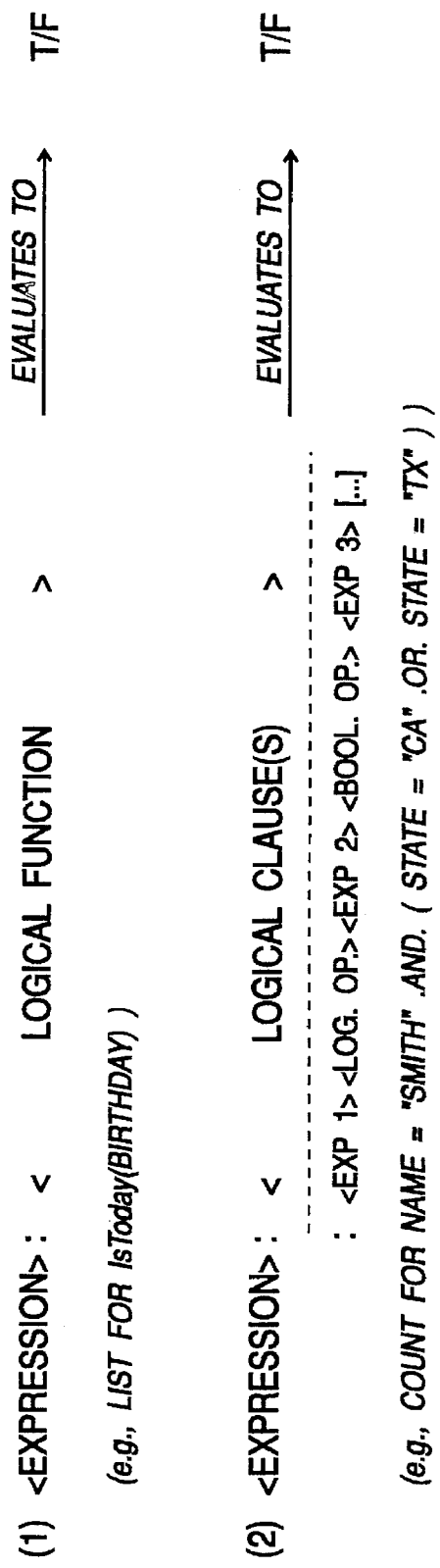

MODE: LEARNED
FILTER 531: udfCanVote(BIRTHDAY)

$T_0$ ASSUME RECORDS MEET THE CONDITION (INIT. TO 1)

DATABASE TABLE 533

| NAME | BIRTHDAY | |
|---|---|---|
| ... | ... | ... |
| AZTEC | 5/2/29 | 1 |
| BAAKE | 1/13/59 | 1 |
| BABBET | 2/14/89 | 1 |
| BABCOCK | 3/15/60 | 1 |
| BAKER | 4/18/54 | 1 |
| BATES | 9/27/88 | 1 |
| BAXTER | 5/14/58 | 1 |
| ... | ... | ... |

BROWSING WINDOW (rows AZTEC through BAXTER)

MASK $T_1$ "LEARN" RECORDS AS THEY ARE READ

| NAME | BIRTHDAY | |
|---|---|---|
| ... | ... | ... |
| AZTEC | 5/2/29 | 1 |
| BAAKE | 1/13/59 | 1 |
| ~~BABBET~~ | ~~2/14/89~~ | 0 |
| BABCOCK | 3/15/60 | 1 |
| BAKER | 4/18/54 | 1 |
| ~~BATES~~ | ~~9/27/88~~ | 0 |
| BAXTER | 5/14/58 | 1 |
| ... | ... | ... |

DISPLAYED TO USER / FILTER OUT

USER JUMPS TO NEW RECORD WINDOW (e.g., GOTO REC. 70,000)

$T_2$ ASSUME NEW RECORDS MEET THE CONDITION (INIT. TO 1)

| NAME | BIRTHDAY | |
|---|---|---|
| ... | ... | ... |
| JOA | 3/12/87 | 1 |
| JOBE | 2/15/61 | 1 |
| JOCKEY | 9/16/60 | 1 |
| JOE | 5/18/93 | 1 |
| JOEL | 4/18/54 | 1 |
| JOESPHS | 9/2/39 | 1 |
| JOHNSON | 10/28/85 | 1 |
| ... | ... | ... |

NEW BROWSING WINDOW $T_3$ "LEARN" NEW RECORDS AS THEY ARE READ

| NAME | BIRTHDAY | |
|---|---|---|
| ... | ... | ... |
| ~~JOA~~ | ~~3/12/87~~ | 0 |
| JOBE | 2/15/61 | 1 |
| JOCKEY | 9/16/60 | 1 |
| ~~JOE~~ | ~~5/18/93~~ | 0 |
| JOEL | 4/18/54 | 1 |
| JOESPHS | 9/2/39 | 1 |
| ~~JOHNSON~~ | ~~10/28/85~~ | 0 |
| ... | ... | ... |

DISPLAYED TO USER / FILTER OUT

FIG. 5C $T_3$

| NAME | BIRTHDAY | |
|---|---|---|
| ... | ... | ... |
| ~~JQA~~ | ~~3/12/87~~ | 0 |
| JOBE | 2/15/61 | 1 |
| JOCKEY | 9/16/60 | 1 |
| ~~JOE~~ | ~~5/18/93~~ | 0 |
| JOEL | 4/18/54 | 1 |
| JOESPHS | 9/2/39 | 1 |
| ~~JOHNSON~~ | ~~10/28/85~~ | 0 |
| ... | ... | ... |

DISPLAYED TO USER

USER JUMPS BACK TO EARLIER SELECTION $T_4$ RECORDS HAVE ALREADY BEEN LEARNED

| NAME | BIRTHDAY | |
|---|---|---|
| ... | ... | ... |
| AZTEC | 5/2/29 | 1 |
| BAAKE | 1/13/59 | 1 |
| ~~BABBET~~ | ~~2/14/89~~ | 0 |
| BABCOCK | 3/15/60 | 1 |
| BAKER | 4/18/54 | 1 |
| ~~BATES~~ | ~~9/27/88~~ | 0 |
| BAXTER | 5/14/58 | 1 |
| ... | ... | ... |

DISPLAYED TO USER

*FIG. 5D*

SYSTEM AND METHODS FOR OPTIMIZING DATABASE QUERIES

This is a continuation application of Ser. No. 08/544,679 filed Oct. 18, 1995, now U.S. Pat. No. 5,560,005 which is a continuation application of Ser. No. 08/085,214, filed Jun. 30, 1993, now abondoned.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to the area of database management systems and, more particularly, to optimized methods and system for querying information from those systems.

Computers are a powerful tool for the acquisition and processing of information. Of particular interest to the present invention are database management systems (DBMSs), which can be regarded as a kind of electronic filing cabinet or repository for collecting computerized data files. As such, these systems serve to maintain information in database files or tables and make that information available on demand.

A database management system serves as a software cushion or layer between the physical database itself (i.e., the data actually stored on a storage device) and the users of the system, thus shielding the database users from underlying hardware-level details. In particular, all requests from users for access to the data are processed by the DBMS. For example, information may be added or removed from data files, information retrieved from or updated in such files, and so forth, all without knowledge of underlying system implementation. In this manner, the DBMS provides users with a conceptual view of the database that is removed from the hardware level. The general construction and operation of a database management system is known in the art. See e.g., Date, C., *An Introduction to Database Systems*, Volume I and II, Addison Wesley, 1990; the disclosure of which is hereby incorporated by reference.

Users of a database management system are perhaps most interested in querying a database, that is, retrieving information according to user-supplied selection criteria. Query operations can be performed to find, change, add, or remove information. More particularly, the user can insert new records into a table, delete records from a table, change values in a field, and find records in a table. A user may ask several different types of questions about the information stored in the DBMS. For example, a user can query a single table, or join two or more tables for a single query. In addition, the user can employ queries to define groups and sets of information within his or her tables and to perform calculations and comparisons on those sets. All told, there is no limit to the complexity with which a query may be constructed.

Perhaps the most popular method for querying a database is Query-by-example (QBE), which allows a user to ask questions and perform query operations by constructing simple examples. Instead of spending time figuring out how to perform the query, the user simply gives the system an example of the result he or she is looking for. In turn, the DBMS automatically determines how to get the answer or perform the operation. Since QBE is interactive and iterative, its queries are highly flexible. If a query does not quite obtain the desired result, for instance, the user can easily fine tune the query and run it again. By constructing queries which build on each other, the user can play "what if" scenarios with his or her data.

Whether performed through a query interface or manually (i.e., command-line or script driven), the basic operation of a query centers around the definition of search criteria or conditions. Search criteria tell the DBMS which records the user wants selected (e.g., for including in a resulting view or answer table). Search criteria are like filter or tests that select records based on entries in one or more fields. For instance, a simple selection condition could include state equal to "CA" (e.g., query expression of STATE="CA"); this condition instructs the DBMS to include only those records with the state field entry equal to "CA".

Many types of selection conditions may be specified. The user can create, for example, selection conditions for alphanumeric, numeric, dollar, and date fields. In addition to specifying exact-match conditions (e.g., AGE=59), users may select records that have entries which fall within a certain range. For example, a user may wish to locate all records meeting a particular range (e.g., AGE>59). This is particularly helpful when one is selecting records based on entries in numeric, dollar, or date fields.

In addition to specifying a single criterion, a user may specify a plurality of criteria. Multiple criteria require a matching record to meet either of two or more tests (logical "OR", such as LASTNAME="JONES" .OR. FIRSTNAME="KEVIN"), or to simultaneously meet all of two or more conditions (logical "AND", such as LASTNAME="JONES" .AND. FIRSTNAME="KEVIN"). Also, criteria may be specified having various combinations of AND and OR conditions, including nesting of conditions, such as LASTNAME="JONES" .AND. (FIRSTNAME= "KEVIN" .OR. FIRSTNAME="JOHN").

It is known in the art to employ one or more index files when searching for information stored in a database file. A typical index file stores for each record in the database file a key expression—data derived from one or more fields of the record (e.g., "JONES" derived from a last name field) —together with a record pointer (e.g., record number) for the record. Index files are usually organized into a format which is efficient for searching (e.g., B-tree), ordered according to the key expression, such as alphabetically. Because information about records may be determined without examining the underlying records themselves, the index may greatly speed up searching (querying) for and sorting of information.

The use of indexing for satisfying searches may be further enhanced by simple use of bitmaps, as has been employed by various DBMS vendors. Atypical implementation is described in SYSTEM AND METHODS FOR INFORMATION RETRIEVAL, International Application No. PCT/US91/07260, International Publication No. WO 92/06440, Apr. 16, 1992, which is hereby incorporated by reference. General operation of such systems will be briefly reviewed.

Consider a query expression of LASTNAME="FOX" .AND. AGE=80, with an existing index on LASTNAME and another index on AGE. The query may be "optimized" by recognizing that existing indices are available for satisfying each logical clause, and that query matches or hits from these indices may be conveniently mapped into one or more solution bitmaps. In operation, the first index may be scanned to determine a first subset of records satisfying the first half (first logical clause) of the query (i.e., LASTNAME='FOX'). The second index may be scanned to determine a second subset of records satisfying the second half (second logical clause) of the query (i.e., AGE=80).

The solution bitmaps or "bitmasks" are constructed as follows. A first temporary solution bitmask is constructed during scanning of the first index. Specifically, if the search criteria is satisfied by a particular record's key value stored in the index file, the corresponding bit (i.e., nth bit for nth record) in the temporary solution bitmask is set. In a like manner, as the second index is scanned a second temporary solution bitmask is constructed, where the corresponding bit in the second temporary solution bitmask is set if the search criteria is satisfied by a particular key value in the index file. By combining the two bitmasks (bitwise operation of "ANDing" the two bit sets), a final solution is ascertainable, all without having accessed the underlying physical records.

Although simple bitmap optimization techniques, such as the foregoing, may improve searching efficiency under appropriate circumstances, the techniques have pronounced shortcomings. In particular, real-world queries (i.e., ones most likely to be useful in everyday, normal user operation) often demand searches on conditions which are "non-optimizable" under these systems. Consider, for example, the query LASTNAME="FULTON" .AND. STATE="CA" specified by a user at runtime. To apply optimization, prior art techniques require at least one pre-existing index which directly supports the query. For the foregoing query, such systems would require at least one index on LASTNAME or on STATE. And to "fully optimize" the search (i.e., apply bitmap optimization), such indices must directly support its corresponding logical clause. That is, for the clause LASTNAME="FULTON" the index must be only on LASTNAME—INDEX ON LASTNAME, but not INDEX ON LASTNAME+FIRSTNAME. Such an approach ignores the realities of everyday use situations where users specify ad hoc query conditions for solving real-world data processing problems.

Most often in a given system, indices will not be available which directly support the query conditions that a user has specified. In the above example, for instance, an index for alphabetizing a customer list would more likely be a composite index on all name fields (e.g., INDEX ON LASTNAME+FIRSTNAME+MI). An index on last name by itself would probably not be as useful to maintain active at all times, unless the database programmer knew before what the ad hoc queries were likely to be. But even if such information were known beforehand, it is still not very practical to keep an active index for every field which is likely to be queried—updating a multitude of indices for a large database table incurs a substantial performance penalty. All told, the design limitations of prior art systems restrict those systems to optimizing a small subset of the queries which would actually be useful to end-users.

What is needed are system and methods which intelligently process all available indices for satisfying a query, including ones which may not directly support the query expression under examination. The present invention fulfills this and other needs.

SUMMARY OF THE INVENTION

System and methods are provided for optimizing the access of information, particularly in response to ad hoc queries or "filter" conditions. A system of the present invention includes a computer having a memory and a processor, a database for storing information in the memory as field values in a record, an indexing component for referencing a plurality of records by key values of the field(s), an input device for selecting desired records by entering a filter (query) condition corresponding to values stored in the field(s), and an optimization module for providing rapid access to the desired records.

The optimization module may employ one or more existing indices for optimizing data access, including using ones which do not directly support the filter expression. The system of the present invention uses information from an index file(s) when possible to eliminate the retrieval and examination of those records which do not satisfy the selection criteria of the search query. The information may be conveniently tracked in one or more bitmasks (bitmaps correlated with records) which indicate records which are of interest, based on the filter condition. In this manner, queries are optimized by minimizing or eliminating retrieval of the underlying data file.

In instances where no indices are available, the optimization module may employ a "learned" optimization method of the invention for on-the-fly learning of records which meet the filter condition. Initially, all records are assumed to meet the filter condition. Then, as records are actually retrieved, those determined not to satisfy the selection criteria of the query are "filtered out" of the set. Again, a set of records satisfying the filter condition may be conveniently tracked in one or more bitmasks. In this fashion, the "learned" bitmask may be used to determine those records which no longer need to be retrieved and re-examined (as long as the filter remains active).

The present invention also includes methods for refreshing bitmasks upon the operation of writing a data record which has been modified (e.g., changed, added, or deleted), and for navigating (browsing) records with a filter in place. A method is also described for a preferred translation of a record number into a corresponding bitmapped position.

BRIEF DESCRIPTION OF THE DRAWINGS

FIG. 2A is a diagram illustrating two modes of filtering in the system of the present invention.

FIG. 2B is a diagram illustrating the composition of query expressions, which include conditions which must be met for a given query or filter.

FIGS. 5C-are block diagrams illustrating operation of Learned Mode optimization.

GLOSSARY data file: A collection of records which resides on a computer storage medium and has a unique identity.

expression: A combination of data from fields, memory variables, elements, or constants joined by operators or functions, that evaluate to one data type. Expressions may evaluate to character, date, numeric or logical type.

field: One variable, or term of information.

"filtered-in" record: Record that meets the filter or search query criteria.

"filtered-out" record: Record that does not meet the filter or search query criteria.

filtered set: A collection of all "filtered-in" records.

FOR expression: A logical expression used to evaluate and group a set of records in well defined collection in which each record will yield the same result either true or false when it is evaluated against this expression.

index: A collection of key values generated from the fields of the data file(s) and sorted in predefined order. Each key value is accompanied by the data file record number from which the key value is derived.

index expression: An expression used to evaluate and set the database records in a predefined order. In the detailed description, the index expression will be denoted as $<exp_i>$.

index file: A collection of one or more indices which resides on a computer storage medium and has a unique identity.

logical clause: A criterion to select a set of data from a database. The clause will typically be in the general form of:

$<expression_1> <logical\ operator> <expression_2>$ which evaluates to true or false, such as LASTNAME= "JONES". A logical clause may include one or more logical functions (see below).

logical expression: One or more logical clauses that are joined by a Boolean operator (e.g., .NOT., .AND., .OR.), such as (LASTNAME="SMITH" .AND. AGE>21).

logical function: A computer language operation that evaluates to result a true or false answer. Examples of commonly-available logical functions include user-defined function or UDF( ), immediate if or iif( ), and the like. An example of a clause including a UDF( ) would be ELIGIBILITY=UDF_Bool_Adult(BIRTHDATE), where the UDF( ) returns true for a record when the age (as determined from BIRTHDATE) is 18 years or older.

logical operator: A symbolic notation of an expression that evaluates to logical type, true or false. Operators include:
 1)= (equal)
 2)> (greater than)
 3)< (less than)
 4)>= (greater than or equal)
 5)<= (less than or equal)
 6)<> (not equal)
 7)# (not equal)
 8) $ (is substring of)

natural order: There is no imposing index order on to a data file for its listing.

record: A collection of data of one or more fields that can be uniquely identified (e.g., by record number).

DETAILED DESCRIPTION OF A PREFERRED EMBODIMENT

System Components

Figure 1A:
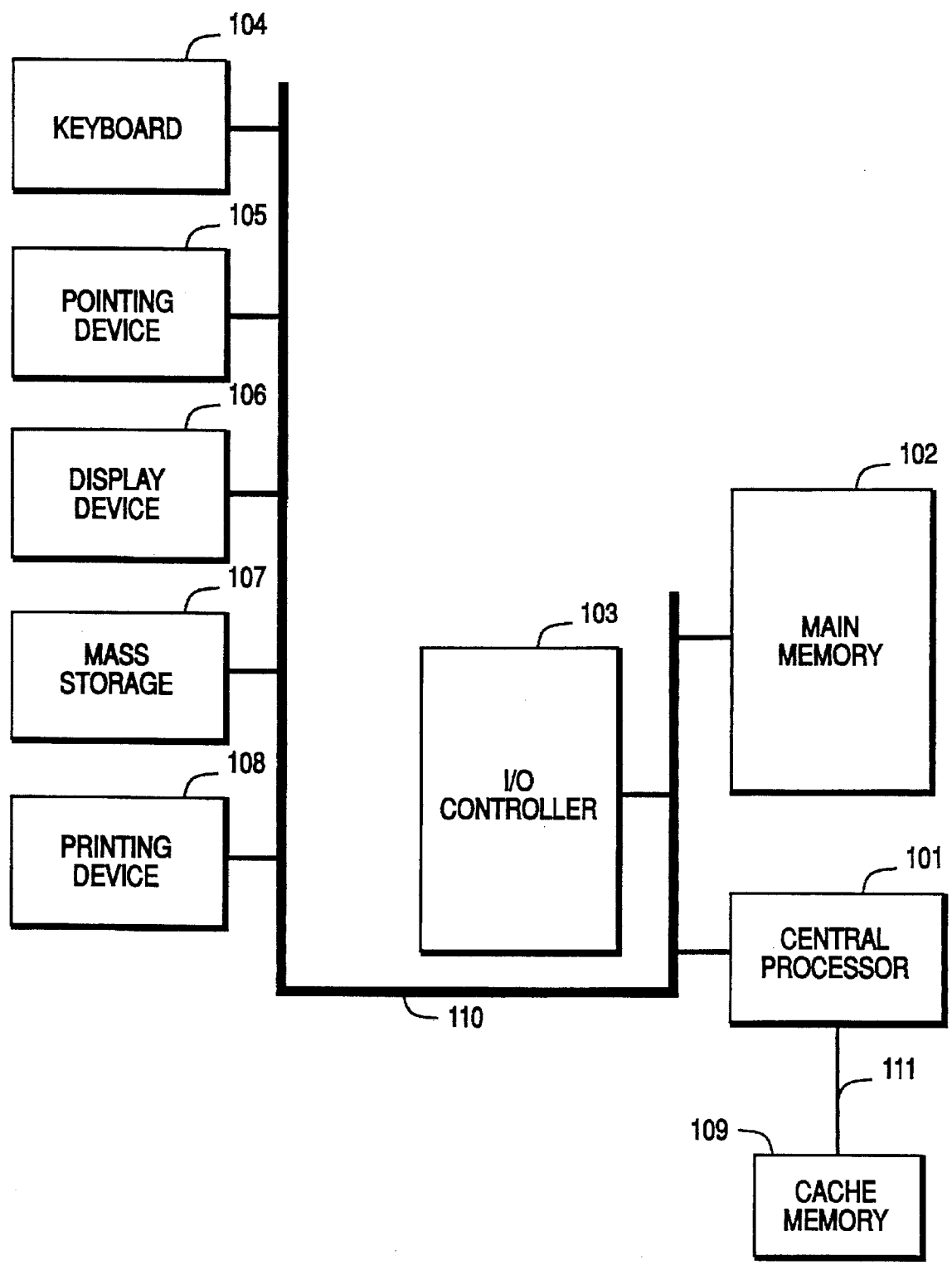
FIG. 1A is a block diagram of a computer system in which the present invention may be embodied.

The present invention may be embodied on a computer system such as the system 100 of FIG. 1A, which comprises a central processor 101, a main memory 102, an input/output controller 103, a keyboard 104, a pointing device 105 (e.g., mouse, track ball, pen device, or the like), a display device 106, and a mass storage 107 (e.g., hard disk). Processor 101 includes or is coupled to a cache memory 109 for storing frequently accessed information; memory 109 may be an on-chip cache or external cache (as shown). Additional input/output devices, such as a printing device 108, may be included in the system 100 as desired. As shown, the various components of the system 100 communicate through a system bus 110 or similar architecture.

Figure 1B:
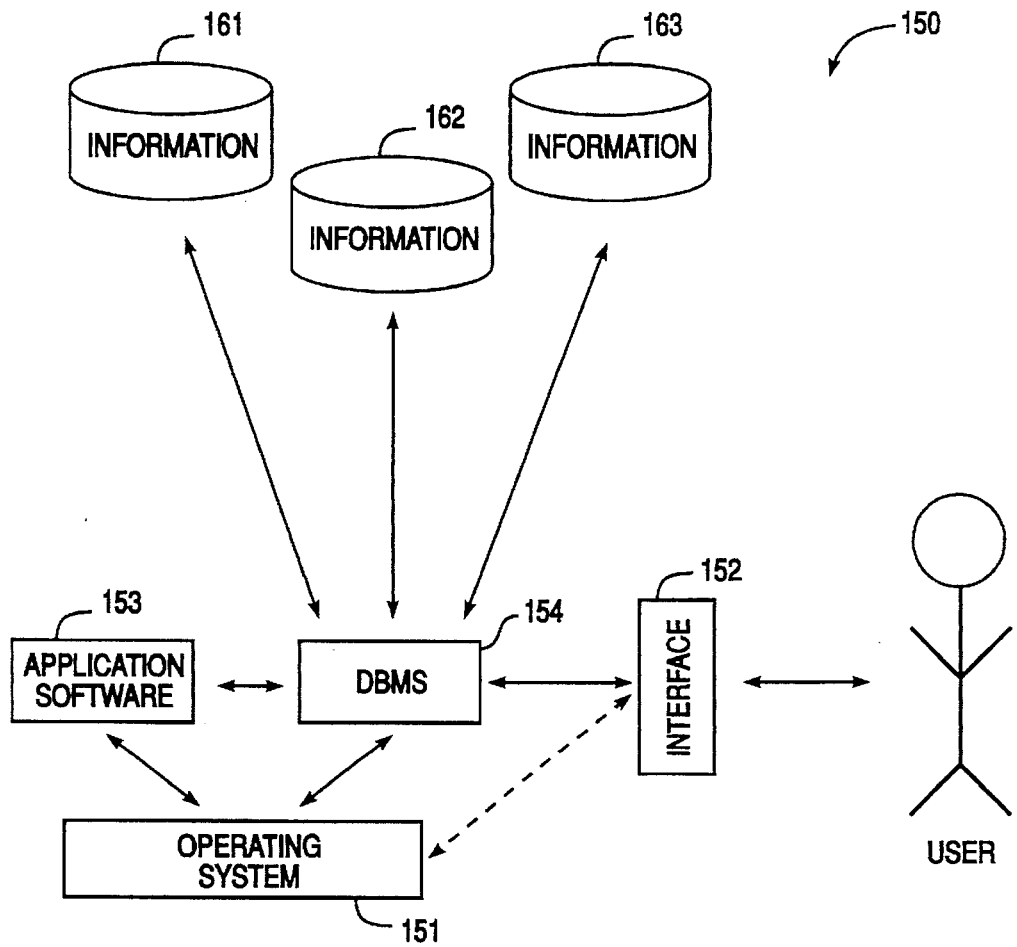
FIG. 1B is a block diagram of a software system, including a Database Management System (DBMS), for controlling the operation of the system of FIG. 1A.

Illustrated in FIG. 1B, a computer software system 150 is provided for programming and operating the computer system 100. Software system 150, which is stored in system memory 102 and on disk memory 107, includes a kernel or operating system 151 and a DBMS 154. OS 151 is the executive or supervisor for the system 100, directing both task management and data management.

DBMS 154, on the other hand, includes a software subsystem for storing, retrieving, and manipulating information in database tables (e.g., tables 161, 162, 163). Under the command of DBMS 154, the system 100 receives user commands and data through user interface 152. Interface 152 includes a built-in query surface or editor for accessing and processing database information. Additional application programs, such as DBMS application software 153, may be "loaded" (i.e., transferred from storage 107 into memory 102) for execution by the system 100, particularly for further controlling the operation of DBMS 154.

In a preferred embodiment, the system 100 includes an IBM-compatible personal computer, available from a variety of vendors (including IBM of Armonk, N.Y.), and operating system 151 includes MS-DOS, available from Microsoft of Redmond, Wash. DBMS 154 preferably includes dBASE IV®, ver. 2.0 (available from Borland International of Scotts Valley, Calif.) and includes as interface 152 dBASE's Command Control and QBE query surface. If desired, other operating systems and/or DBMSs (or alternative configurations thereof) may be employed in accordance with the principles of the present invention. System 150 may, for example, operate in a shared environment, such as in a client/server configuration running in a Local Area Network (LAN) environment.

Figure 1C:
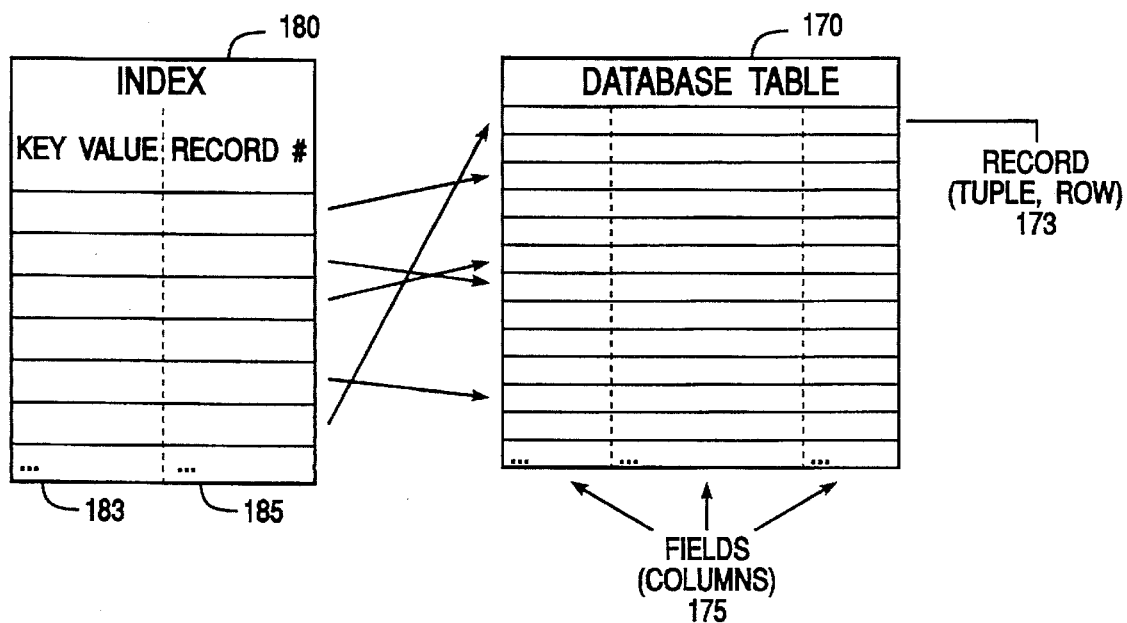
FIG. 1C is a block diagram illustrating (conceptually) the construction of a database table and accompanying index.

In database management system 154, information is conceptually represented as tables. As shown in FIG. 1C, a table 170 is organized (logically) into horizontal rows (tuples) 173 and vertical columns (fields) 175, thus making it easy for a user to examine or change data. Each row or "record" contains all available information about a particular item, such as storing information about an individual person, place, or thing (depending on what the table tracks). A record for an employee, for instance, may include information about the employee's ID Number, Last Name and First Initial, Position, Date Hired, Social Security Number, and Salary. Thus, a typical record includes several categories of information, that is, each record in the table is made up of several categories of information about one specific thing.

Although a database record includes information which is most conveniently represented as a single unit, the record itself includes one or more columns or categories of information. A vertical column contains one category of the data or "field" that makes up a record. Each field contains one category of information about the person, place, or thing described in the record. In the employee table, categories include ID Number, Last Name and First Initial, Position, Date Hired, Social Security Number, Salary, and so on.

Internally, tables may be stored by the system as a sequence of fixed-length or variable-length binary records in a single disk file. The system uses a record number as an internal counter to keep track of each record. Because the DBMS shields the database user from knowing or even caring about underlying hardware-level details, the system manages record numbers automatically, with precautions taken so an end-user cannot change them directly. Thus, all requests from users for access to the data, including requests to retrieve, add, or remove information from files, are processed through the DBMS.

By employing one or more database indexes, the records of a table can be organized in many different ways, depending on a particular user's needs. When a user requests an index, the system creates a file that contains the indexed field's values and their corresponding locations. The system refers to the index file when locating and displaying the records in a table, thus affording quick retrieval of the information sought. Although one can use an index to view the records in a different order from the default order, the records themselves remain stored in the same physical location as they were entered.

As shown by index 180 of FIG. 1C, for example, an index may be constructed as a single disk file which is referred to internally by the system for locating and displaying records in a database file (e.g., table 170). Index 180 stores two types of information: index key values 183 and unique record numbers 185. An index key is a data quantity composed of one or more fields from a record; keys are used to arrange (logically) the database file records by some desired order (index expression). Record numbers, on the other hand, are unique pointers to the actual storage location of each record in the database file. In this manner, an index for a database file is similar to the index of a book, which lists subject keys and page numbers that point to where the actual information is located in the book. Specifically, an index organizes (logically not physically) the records in a database file according to the values in one or more fields of interest. Because information about records may be determined without examining the underlying records themselves, the index may greatly speed up searching (querying) for and sorting of information.

In a preferred embodiment, the system may store for each data table one or more indices; each index, in turn, stores key values derived from the fields of the table together with a reference to the data record from which the key value is derived. An index file itself may be organized as an ordered tree structure, such as a conventional B-tree structure. General techniques for the construction and operation of B-tree index files is well documented in the technical, trade, and patent literature. For a general description, see Sedgewick, R., *Algorithms in C*, Addison-Wesley, 1990. For a description of B-tree indices implemented in a PC DBMS system, see Baker, M., *B-tree indexing: A look at indexing tradeoffs in dBASE, Clipper, and FoxPro*, Programmer's Journal, Vol. 8.6, November/December 1990, pp. 42–46. Also, see SYSTEM AND METHODS FOR INFORMATION RETRIEVAL, International Application No. PCT/US91/07260, International Publication No. WO 92/06440, Apr. 16, 1992, which describes B-tree index for Fox® PC DBMS software. Multiple index files, including dBASE's .mdx files, have also been described in the technical literature; see e.g., Freeland, R., *Exploring MDXs*, Data Based Advisor, February 1991, pp. 85–87. The disclosures of each of the foregoing references are hereby incorporated by reference.

Methods for Optimized Data Access

A. General

In system 150, two modes for search query operation or "filtering" are provided. As shown in FIG. 2A, the modes are: global and local. With global filtering, a query or filter condition applies to an entire set of data, that is, global to a table. An example of global filtering, using the dBASE language syntax of SET FILTER TO <EXPRESSION>, would include:

SET FILTER TO LASTNAME="SMITH"

With local filtering, on the other hand, the condition is applied to a range of records, that is, local to a particular subset of records. An example of this, using the dBASE language syntax of <COMMAND> FOR <EXPRESSION>, would include:

LIST FOR LASTNAME="THE" .AND. STATE="CA"

Whether local or global, however, the process of filtering information records may benefit from optimizations.

B. Composition of query (filter) expressions and index support

As shown in FIG. 2B, a query or filter expression includes one or more search criteria. Specifically, the query expression may include a logical function or one or more logical clauses, as shown. A logical function is an entity which evaluates to true or false. An example includes, for instance, a user-defined function (UDF) which tests whether a date meets a certain condition (e.g., past due). A logical clause, on the other hand, is typically in the form of an index expression (e.g., LASTNAME) and a key expression (e.g., "SMITH") separated by a logical operator (e.g., "="); a clause may also include one or more logical functions. In either case, all expressions ultimately evaluate to either true or false for a given record and search condition.

Figure 2C:
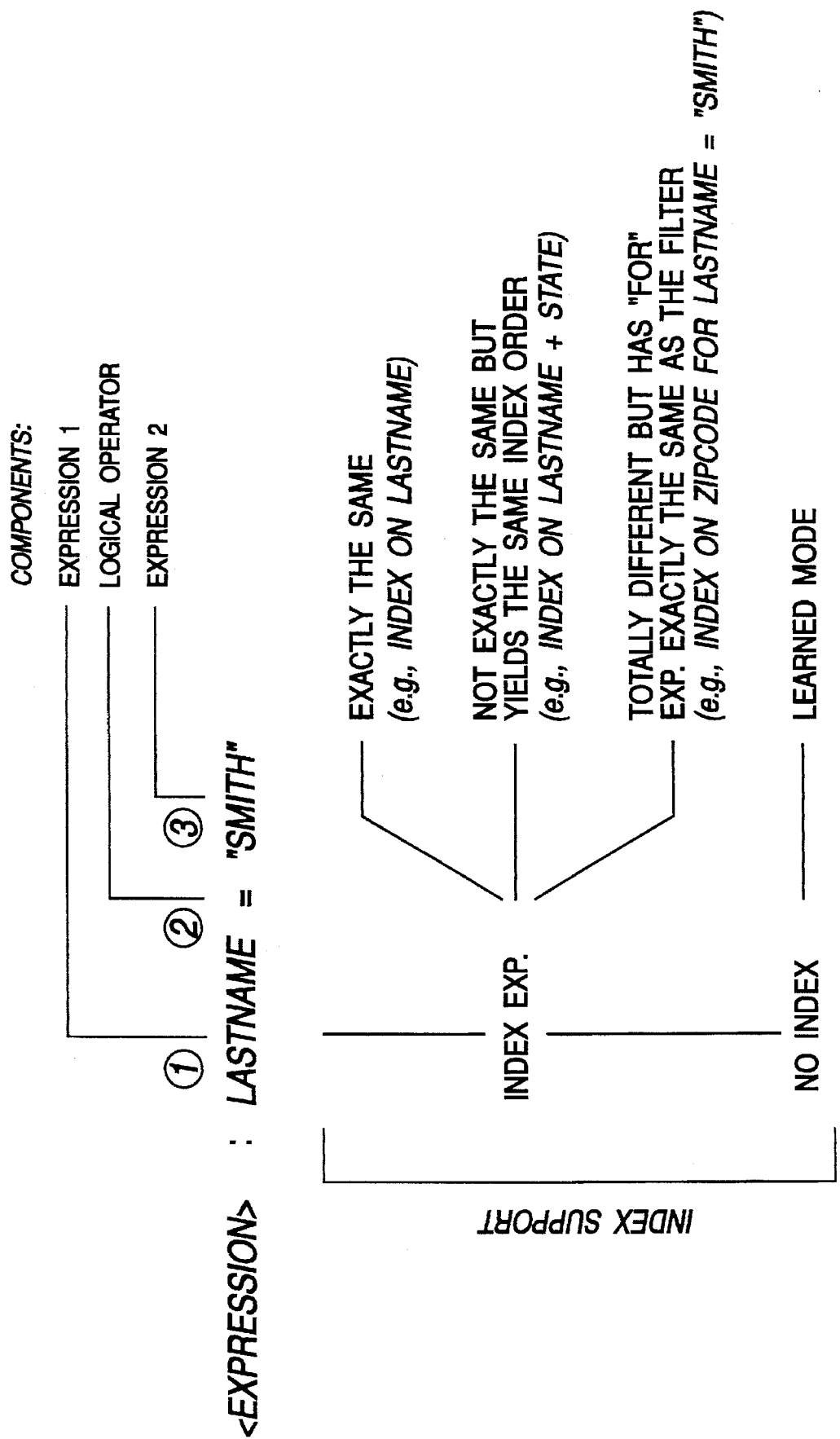
FIG. 2C is a diagram illustrating the atomic components of a query expression and the various levels of index support which may exist for supporting the expression.

A query expression broken down into the atomic components of an index expression, logical operator, and key expression is shown in detail in FIG. 2C. Based on the actual components of a query, the system determines whether there exists an index having an index expression ($exp_i$) which "supports" a logical clause of the query expression. Unlike prior art systems, however, the system of the present invention does not require direct index support of a clause for optimization.

As shown in FIG. 2C, a spectrum of support may exist. The simplest case is that of full support—an index expression exists which completely satisfies the condition of the clause. For instance, an existing index on last name (e.g., dBASE command of INDEX ON LASTNAME) may be used to satisfy the query of LASTNAME="SMITH". This case is straightforward and is adequately addressed by conventional systems.

An index expression need not be exactly the same as a corresponding expression in a logical clause to be useful, however. In particular, the present invention recognizes that an index expression may exist which is not exactly the same as the corresponding index expression in the query but, nevertheless, yields meaningful information for satisfying the condition of the query. For instance, an index may exist which, although it does not exactly satisfy a given condition, nevertheless yields the same index order (as an index which does exactly satisfy a given condition). Consider, for example, a composite index based on LASTNAME and STATE (e.g., dBASE command of INDEX ON LASTNAME+STATE). This index yields an index order which is the same as an index on LASTNAME alone. Hence, the composite index may be advantageously employed for satisfying a condition of LASTNAME= "SMITH", despite the fact that the index does not support (i.e., exactly match) the index expression of the condition directly.

Also of potential value is an index expression which is totally different (i.e., index expression based on a different field(s)) but has a conditional expression (dBASE "FOR" expression) which is exactly the same as the query or filter. (For a discussion of conditional indices, see dBASE IV 2.0: Programming in dBASE IV, available from Borland International of Scotts Valley, Calif.) Consider, for instance, an index created on a ZIPCODE field but only for records where LASTNAME is equal to "SMITH" (e.g., dBASE command of INDEX ON ZIPCODE FOR LASTNAME= "SMITH"). Note that the conditional expression LASTNAME="SMITH" is exactly the same as the desired query or filter (e.g., SET FILTER TO LASTNAME= "SMITH").

Employing the foregoing principles, the system of the present invention can also optimize queries which include complex expressions (e.g., one employing a function which returns a value). Given a filter expression of LASTNAME= "SMITH" and an index on last name (INDEX ON LASTNAME), both the present invention and conventional systems recognize that the index may be used to optimize the query operation. However, such is not the case when a filter or query expression includes complex syntax, for example:

INDEX ON (UPPER(TRIM(LASTNAME))+UPPER(TRIM(FIRSTNAME)))

(the function UPPER( ) converts a text string to uppercase, and the function TRIM( ) strips trailing space characters from a text string). Since the index expression (UPPER (TRIM(LASTNAME))+UPPER(TRIM(FIRSTNAME))) of the existing index does not match the index expression of the query (e.g., LASTNAME), conventional systems treat the query as non-optimizable. In contrast, the system of the present invention again recognizes that the above index yields the same record ordering as is required by a query expression requesting LASTNAME="SMITH".

At the extreme end of the spectrum illustrated in FIG. 2C is the case of absolutely no index support for the query. The system of the present invention provides a "learned" mode for satisfying queries without index support. If there is no index, the system still creates a bitmap; each bit is set equal to 1 (i.e., it is assumed at the outset that all records meet the specified query condition). As the table is scanned, records determined to not meet the query condition are removed from the bitmask (e.g., their corresponding bit is toggled from 1 to 0). Thus, on subsequent query operations performed for the expression, the system may restrict itself to those records remaining in the set.

C. Modes of operation

Figure 2D:
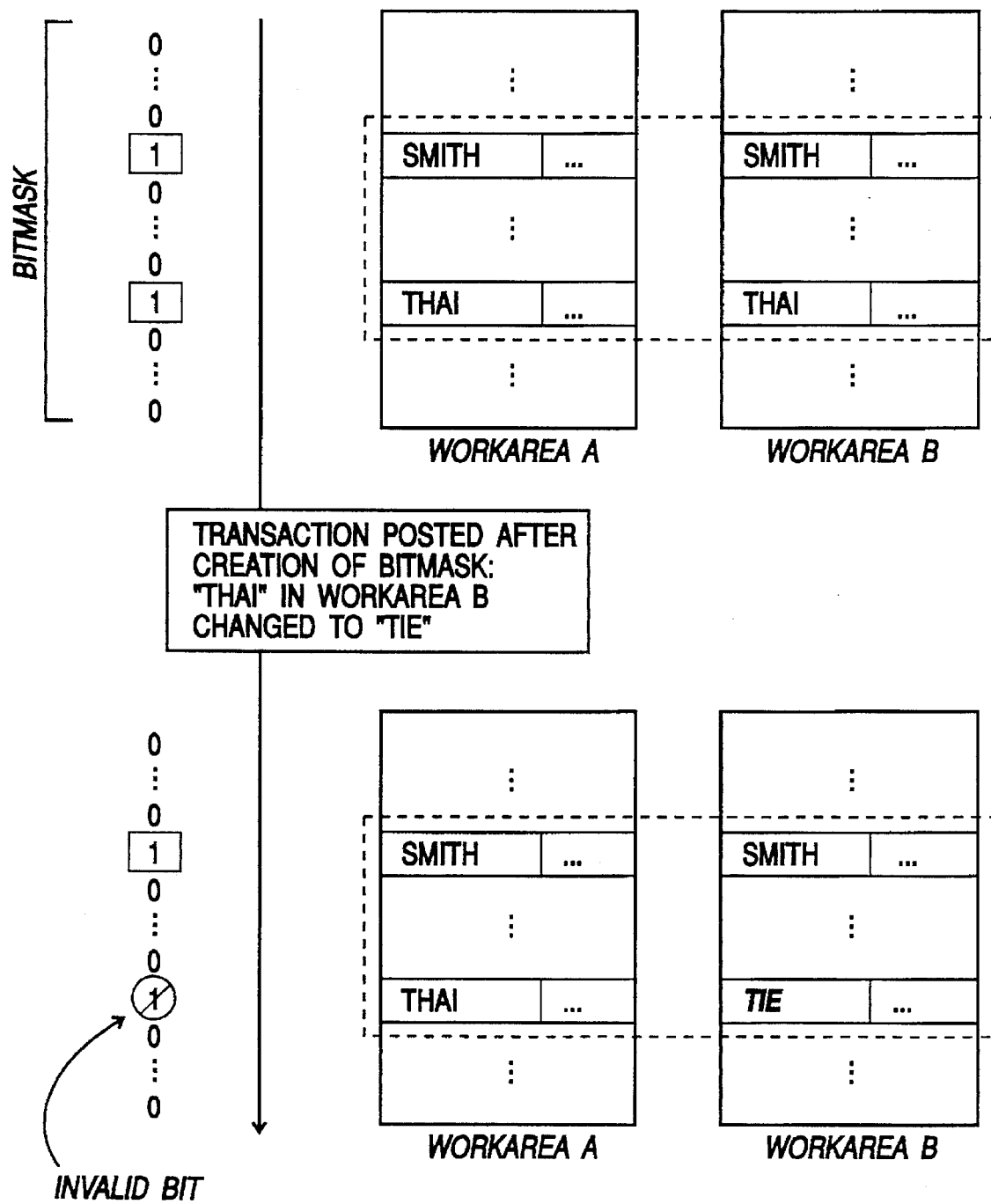
FIG. 2D is a block diagram illustrating the effect of a real-time change posted to a table from which a bitmask depends.

The system of the present invention provides four levels or modes of optimization:

(1) Non-Optimized Mode (NOM) query: The evaluation of the search query will yield a change for each record in the data file dynamically. Consider the example, shown in FIG. 2D, of setting a filter to last name of one work area greater than or equal to the last name on another work area:

SET FILTER TO A→LASTNAME>=B→LASTNAME where A→LASTNAME is a field in the first work area (A), and B→LASTNAME is a field in the second work area (B). When operating in one workarea, the contents of the other workarea cannot be guaranteed (assuming a lock is not maintained on that workarea); hence, a reliable bitmap cannot be created. Specifically, a bitmask created for the other work area is invalid as soon as a change (e.g., transaction posted by another user) in the other work occurs.

Figure 2E:
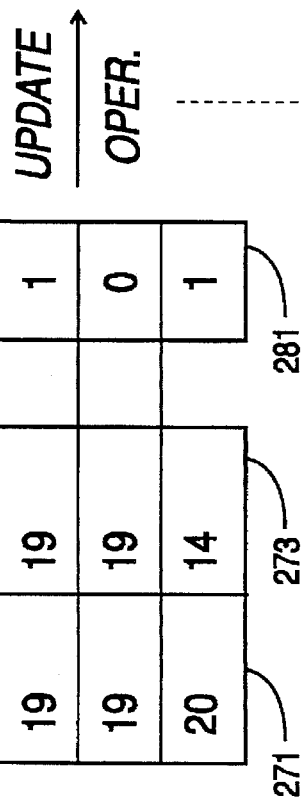
FIG. 2E is a diagram illustrating the effect of a real-time change posted to a single table having a bitmask which depends on a relationship between fields of the table (i.e., interrelated fields).

The problem of real-time updates invalidating an existing bitmask is not limited to filters applied to multiple workareas. As illustrated by FIG. 2E, real-time updates may invalidate solution bitmasks created for a single table. Consider, for instance, a single table 270 having a filter condition which interrelates two fields 271, 273:

SET FILTER TO FLD_1>=FLD_2 that is, set a filter to include those records where a first field (FLD_1) value is greater than or equal to a second field (FLD_2) value. At time $T_1$, bitmask 281 may be constructed, based on the state of table 270a. The table is not static, however. By time $T_2$, the table (shown as 270b) has changed. Specifically, a new value for the second field of a record has been posted; as a consequence, the bitmask (shown as mask 282) is no longer valid.

Thus, real-time or "on-the-fly" changes may affect the validity of the filters. Nevertheless, conventional systems assume that the data are static. At best, such an assumption leads to incorrect query results and at worst leads to corruption of data (e.g., when a query result is used in turn to effect a change to the data). Although the data may be "locked" against change, such an approach is unacceptable in multi-user, transaction-based systems. By recognizing and providing for these instances, the system of the present invention provides query optimization without compromising the integrity of the results or underlying data.

(2) Full Mode (FM) query: This level of optimization is available in instances where an evaluation of the search query results in a correct determination of the status of each record in the data file. As an example of Full Mode, consider the following selection criteria:

SET FILTER TO NAME='Elayne' .AND. AGE>=30 .AND. AGE<=40 where NAME and AGE both are active indices (e.g., index file(s) opened along with the data file). Here, each record can definitely be determined to be either "filtered-in" (meets the condition) or "filtered-out" (does not meet the condition) from information available from one or more existing indices. Thus, the determination can be made before the underlying records are read from the data file.

(3) Learned Mode (LM) query: Complimenting the Full Mode is the Learned Mode. In this mode, there is a possibility that a record's status cannot be determined until the record is retrieved and examined from the data file. Again, consider the query of:

SET FILTER TO NAME='Elayne' .AND. AGE>=30 .AND. AGE<=40 with no active index for NAME or AGE (in contrast to the above Full Mode example). Which records ultimately meet all search criteria cannot be fully determined until the records are retrieved and examined. Once a record is retrieved, however, the system may determine whether to "filter-out" the record; a bitmap may be updated accordingly. On subsequent operations, the filtered-out record will no longer be accessed (again, as long as that filter remains active). This approach may work in conjunction with a supporting index. If an index is available for NAME, for instance, the system may create a bitmap mask from that index (e.g., for indexed records with name of Elayne). From that bitmap, the system may in turn examine records on-the-fly to determine those which should be "filtered-out" (i.e., those which do not have AGE>=30 .AND. AGE<=40). Once filtered-out, a record is not accessed on subsequent operations (while the filter is active).

(4) Partially Optimized Mode (POM) query: The evaluation of the search query might change the status of a subset of records unpredictably. This query mode is different from the Learned Mode where once an undetermined-status record is retrieved and examined, its status becomes predictable. The Partially Optimized Mode may be thought of as a query having fully optimized and non-optimized components. Consider the following filter:

SET FILTER TO FIRSTNAME=B→FIRSTNAME .AND. LAST-NAME="Doe"

This example has two logical clauses:

1) FIRSTNAME=B→FIRSTNAME (NOM clause)
2) LASTNAME="Doe" (FM clause with a support of a active index in workarea #1)

This query would disqualify all records in the current work area which do not contain value of "Doe" in the LAST-NAME field. Whether the "Doe" records will dynamically be "filtered in" would depend on the FIRSTNAME value of both work areas at the time of evaluation. These "Doe" records will therefore need to be re-examined again because, even though they may currently meet query criteria, it cannot be assumed that they meet the query criteria at all times.

Even though the expression cannot be fully optimized, the maximum number of records which satisfy the condition is the same as those satisfying the fully optimized condition (i.e., LASTNAME="Doe"). Thus, for Partially Optimized mode, the non-optimized records must be re-examined during subsequent query operations, as they may change during the interim. Although they may meet the condition during a particular scan, they may change value in the interim. In the worst case, however, the number of records meeting the condition will be no greater than those satisfying the fully optimized condition.

D. Filter Optimization

Figure 3A:
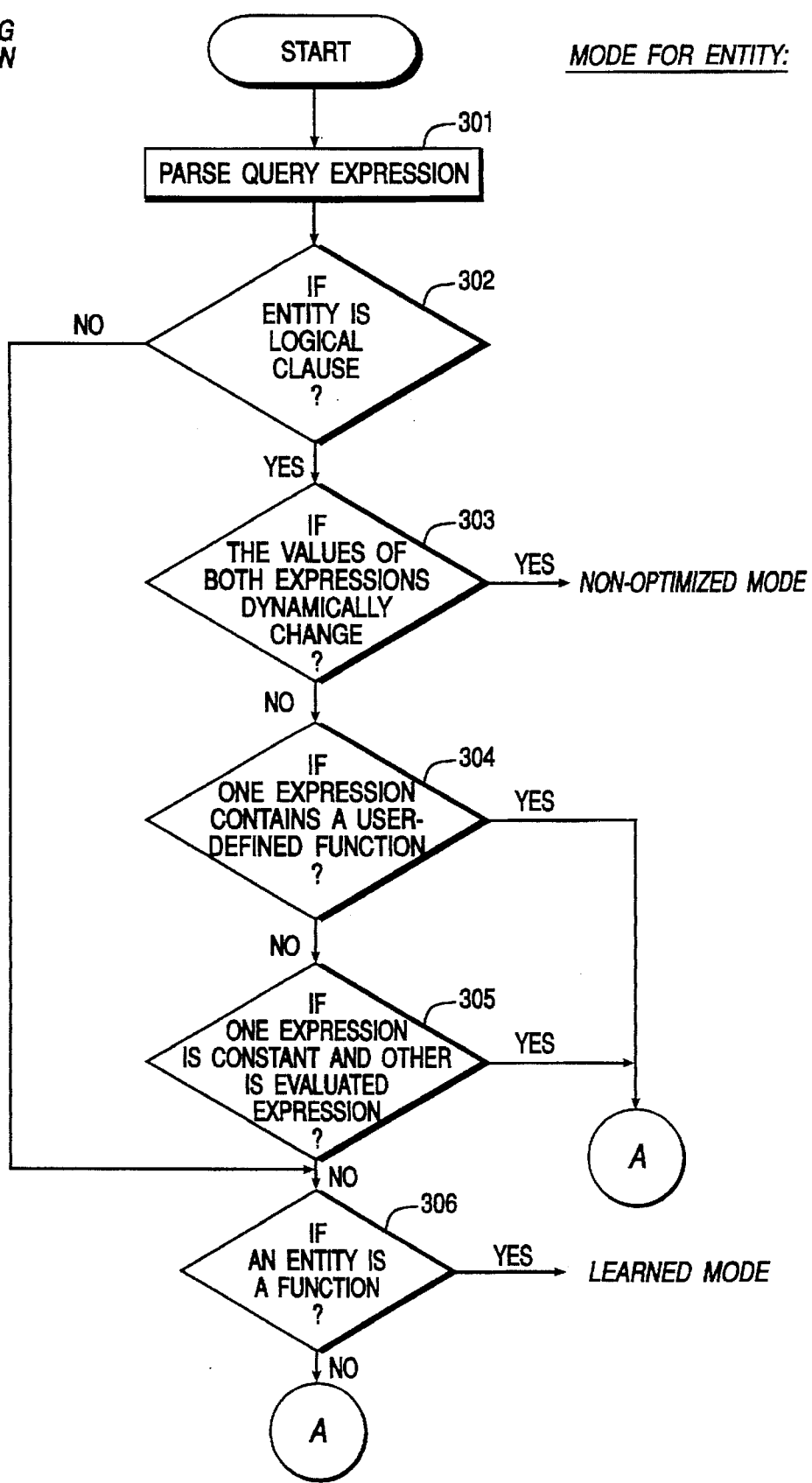
FIGS. 3A–C are flowcharts illustrating methods of the present invention for determining optimization type or mode for a given query expression.
Figure 3B:
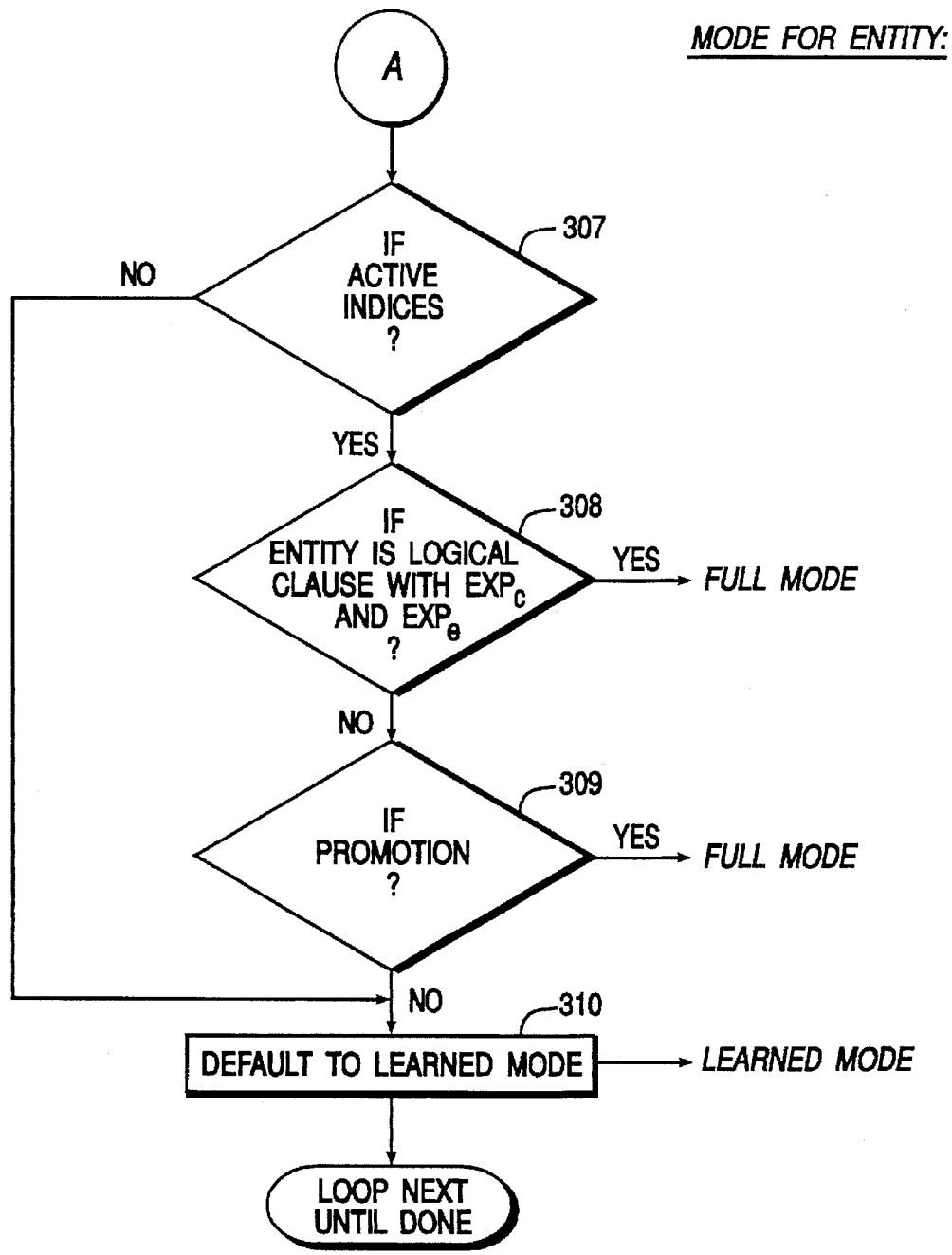
Figure 3C:
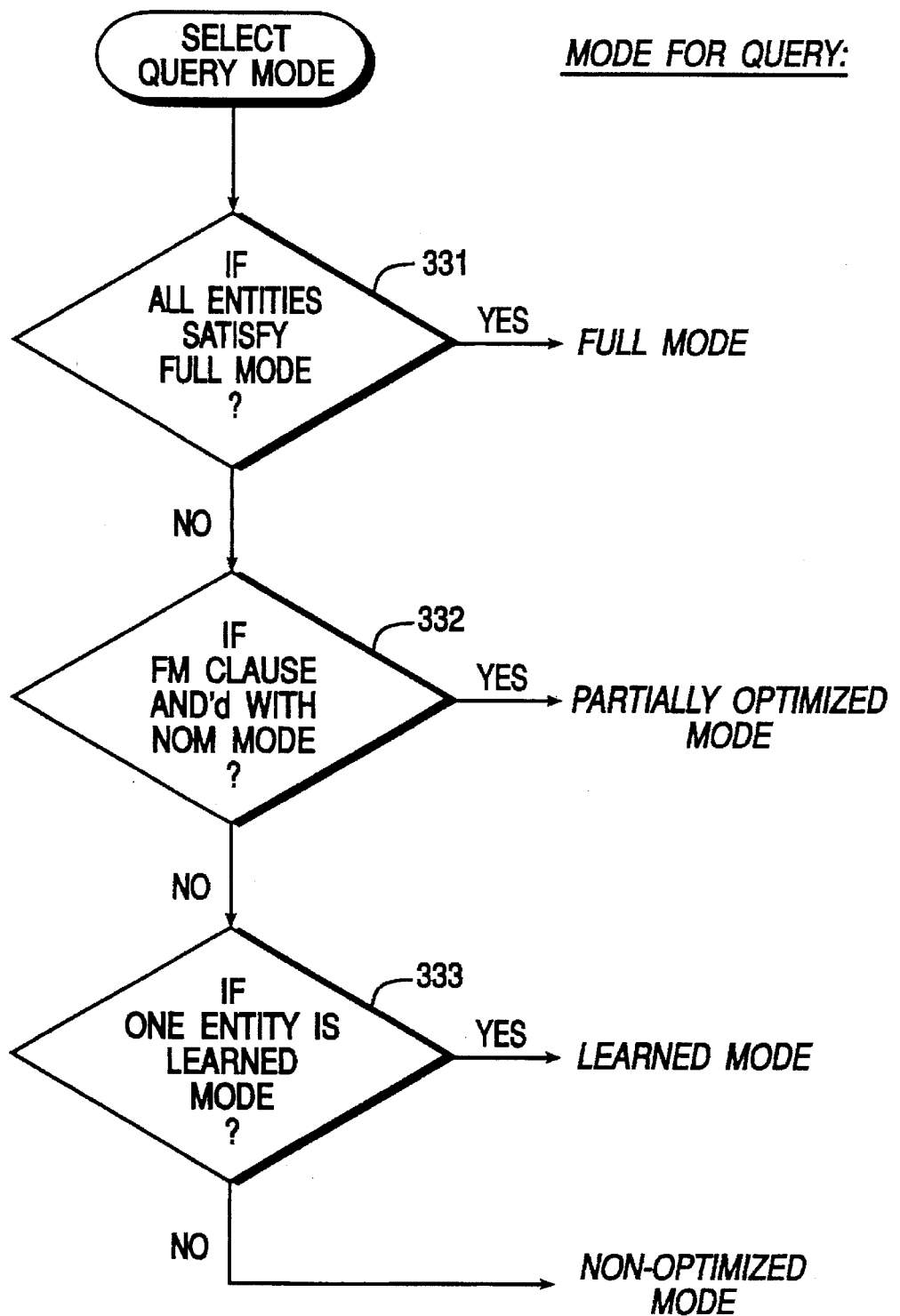

A method 300 of the present invention for determining the level of optimization to apply to a search query or a filter is illustrated in FIGS. 3A–C. The method may employ any active indices (i.e., ones which are updated), including secondary ones, which may be available. Thus, the method does not depend upon a particular master index (i.e., the index controlling the ordering of the table as viewed by a user).

The steps of the method are as follows. At step 301, the query expression is parsed—broken down into smaller entities. A complex logical expression, such as one having multiple logical clauses separated by Boolean operators (optionally including or in combination with one or more logical functions) is distilled into its constituent members. Each entity (e.g., single logical clause, or nested logical clauses) parsed from the expression will be examined in turn for its level of optimization. The examination for each entity will now be described.

If an entity is a logical clause at step 302 (e.g., not just a logical function), the method proceeds to steps 303–305 to test the nature of its expressions. Otherwise (no at step 302), the method skips down to step 306. At step 303, if the values of both of the expressions dynamically change for each record, then no optimization is to be applied (Non-Optimized Mode) to this entity; the logical clause is a NOM clause. An example of such a condition is when both expressions of a clause reference a changing field or function (e.g., SET FILTER TO FLD1>=FLD2).

As will be described below (with reference to FIG. 3C), if this "non-optimized entity" is the only entity in the query expression (i.e., this is the single entity for the expression), the search query will be a Non-optimized or NOM query. On the other hand, if there exists one or more other entities, particularly Full Mode ones, the NOM clause may be ANDed with a Full Mode (FM) clause to yield a Partially Optimized Mode (POM) query. For a POM query, those records that are not in the filtered set as evaluated from the FM clause, will not be retrieved and examined. Therefore, the search will be more efficient than a non-optimized one.

Continuing with the method 300, if the values of both of the expressions do not dynamically change for each record at step 303 (no), the method continues to step 304. At that step, if an entity is a logical clause and one of its expressions contains a user-defined function (UDF), the method skips to step 307 to ultimately determine if Learned Mode optimization is applicable to the query.

If one of the expressions of the entity does not contain a user-defined function (UDF) (no at step 304), the method proceeds to step 305. At that step, if one of the expressions of the entity under examination is a constant or evaluates to a constant (denoted herein as $exp_c$) and the other is an evaluated expression (denoted herein as $exp_e$), the method skips to step 307.

At step 306, if an entity is a function, the optimization for the entity is Learned Mode. Otherwise (no at step 306), the method proceeds to step 307. At that step, the method checks whether one or more active indices are available for optimizing the search. If not, the method skips to step 316. Otherwise (yes at step 307), the method proceeds to step 308. If the entity is a logical clause having both $exp_c$ (i.e., expression is a constant or evaluates to a constant) and $exp_e$ (i.e., evaluated expression) at step 308, Full Mode optimization is applied. Otherwise (no at step 308), the method proceeds to step 309.

At step 309, an attempt is made to "promote" the entity to Full Mode optimization. Promotion to Full Mode occurs when the function and the $\exp_c$ of an entity meet one of the following criteria:

a) Its value is the same as that of any active $\exp_i$ evaluated against each record in the data file, provided that the index does not have a conditional ("FOR") expression.

b) Its value might not be the same as the key value of any active index, but assuming that an index can be created using the $\exp_c$ as an $\exp_i$ and its order exactly matches the ordering of one of the active indices, provided that the index does not have a conditional ("FOR") expression.

c) Its $\exp_c$ exactly matches one of the conditional ("FOR") expressions of an active index. In other words, the FOR expression of the index establishes the same collection of filtered records. If any of one of these conditions holds true (yes at step 309), the optimization is promoted to Full Mode for the entity. Otherwise, the method proceeds to step 310 to default to a Learned Mode.

Once all the entities of the query expression have been parsed according to the method 300, the system determines optimization for the query expression (as a whole). As shown in FIG. 3C, the method proceeds as follows. At step 331, if all entities of a query satisfy Full Mode optimization criteria, optimization for the query expression is set to Full Mode.

If Full Mode optimization is not available, the method proceeds to step 332 to determine if Partially Optimized Mode is available. This condition exists when the query includes a Full Mode entity which can be ANDed (i.e., AND bitwise operation of the sets) with a Non-optimized Mode entity. Provided that Partially Optimized Mode is not available for the query, the method proceeds to step 333. At that step, if the query comprises one entity conforming to Learned Mode criteria, optimization of the search query will also be Learned Mode. Only in instances where none of the above are available will a query be non-optimized.

E. Representing a Filtered Set

If a search query or a filter is determined to be optimizable, a collection of the representations of the filtered records has to be established. As referenced above, a bitmask represents an efficient way for handling a data set with a large amount of records. Specifically, each record may be represented by the smallest computer storage unit called a bit (binary digit), which either has a value of 1 or 0. In a preferred embodiment, a bit value of 1 represents a record that belongs to the filtered set (i.e., "filtered-in" record). A value of 0, on the other hand, represents a record that does not belong to the filtered set. It is this collection of bits which comprise a bitmap representing a set of records.

The size of a bitmap can be calculated. To map an entire data file, the size of the bitmap is calculated as follows:

Let
m=unit of modulus (byte, ushort, uint or ulong . . . )
x=size of the bitmap in a m-unit
n=number of records in the data file
c=number of records allowed to grow (appended) until the size of the map is to be recalculated Then $x=((n+c)/m+1)$ /*—EQUATION#1—*/

Fundamentally, each logical clause or function will have its own bitmap or "source bitmap," These bitmaps are then masked together (combined) using the Boolean operator applied to them to generate a final bitmap or "destination bitmap," which may be used for providing record access. To be more efficient (e.g., conserve memory resources), not all source bitmaps have to be generated at one time. Of course, if there is only one search criterion, the source bitmap and the destination bitmap are one and the same.

If multiple logical clauses or functions are present, at least two source bitmaps are required. One later becomes the destination bitmap after the masking process. The other bitmap will then be used for subsequent logical entity and discarded when all entities are processed. Unless a logical clause is Full Mode optimized, all bits of the bitmap are initialized to logical 1—that is, the bits are set with the assumption that all records would meet the search query (to insure they will be examined at least once).

The position of the bit in the bitmap must identify a corresponding record position. Thus, the bit position should be translatable into a corresponding record number (or offset/position). Accordingly, the system includes a set of logic operations for identifying a record number given a bit position and vice versa. As will be described below, however, a preferred method of the present invention for translating positions does not employ the simple, yet inefficient, technique of defining the nth bit to represent the nth record, such as is employed by conventional systems (e.g., the above-referenced SYSTEM AND METHODS FOR INFORMATION RETRIEVAL). Instead, the present invention defines a mutually indexed one-to-one relationship between the bitmap and the data file which advantageously employs the right-to-left bit-ordering (i.e., bit 7 to bit 0) used by modern-day microprocessor systems, thus enhancing the efficiency of searching for matched data.

The following description will focus on a methodology of the present invention for providing logic operations which allow a record to be SET or RESET using a unit of byte-modulus, an 8-bit unit. Those skilled in the art will appreciate, however, that alternative methodologies may be employed in accordance with the teachings and principles of the present invention to bring about this one-to-one relationship.

An exemplary method of the present invention for providing logic operations which allow a record to be SET or RESET using a byte (or other) unit may be constructed as follows (shown in C programming language):

```
#define SET     1
define RESET   0 void masking_thebit (long, byte);

byte *bitmap = 0L;

void masking_thebit (long record, byte maskingflag)
{
        long r;
        byte *ptr;

if (bitmap == 0L) /*-- no active filter of NOM query --*/
           return;

/*----------------------------------------*/
        /*-- index a record to its corresponding bit in bitmap --*/
        /*----------------------------------------*/
        r   = recno – 1L;
        ptr = bitmap + (r >> 3);

/*----------------------------------------*/
        /*-- reset/set the corresponding bit --*/
        /*----------------------------------------*/ if (maskingflag == RESET)
           *ptr &= ~ (1 << (r & 7));
```

```
      else
        *ptr |= (1 << (r & 7));
}
```

As shown, a preferred method of the present invention for translating a record number follows the convention of bit ordering in a byte (or other system unit). Thus, the relationship between a record number and its corresponding bit includes the following pattern (shown for the first 11 bits):

```
Record#:  8  7  6  5  4  3  2  1  16  15  14 ...
Bit#   :  7  6  5  4  3  2  1  0   7   6   5 ...

<——————— byte #0 ———————><——— byte #1 —
```

According to the present invention, an exemplary method is provided for combining source bitmaps to generate a destination bitmap. Again, the example uses byte-modulus for purposes of illustration and not limitation. Those skilled in the art will appreciate that any other unit of modulus such as short, int, long, double, and the like may be employed. An exemplary method in accordance with the present invention may be constructed as follows (again shown in C programming language):

```
#define AND_OP   1
#define OR_OP    2
#define NOT_OP   3

/*-- value of x from Equation #1 shown above --*/
int bitmap_size = 0;

/*-- value of n from Equation #1 shown above --*/
long numrec = 0;

void combine_bitmap (byte *, byte, byte *);
/*DMAN_D------------------------------------------------- */

/*                                                        */
/* NAME                                                */
/* void combine_bitmap - combine two source-bitmaps to generate */
/*                                                        */
/*              a destination-bitmap                      */
/*                                                        */
/* SYNOPSIS                                            */

/* void combine_bitmap (byte *s_bmp1,byte bool_op,byte *s_bmp2) */

/* DESCRIPTION                                         */

/*                                                        */
/* –combine_bitmap– takes 3 arguments:                 */

/*         1) byte *s_bmp1:  pointer to source-bitmap #1  */

/*         2) byte bool_op:  Boolean operator representation */

/*                           (AND, OR, NOT)               */

/*         3) byte *s_bmp2:  pointer to source-bitmap #2  */

/*                           This is also used as destination */

/*                           bitmap                       */

/*                                                        */
/*DMAN_END----------------------------------------------- */ void clear_bits_from_lastrec(byte *);
/*                                                        */
/* NAME                                                */
/* void clear_bits_from_lastrec - reset all bits pass     */

/*      lastrec number, last record number in the data file. */

/*      Every bits pass the last bit that represents the last */

/*      record number in the data file are either invalid or */

/*      to be used for appended records. They have to be reset. */

/*                                                        */
/* SYNOPSIS                                            */

/* void clear_bits_from_lastrec (byte *d_bmp)           */

/*      /d_bmp - pointer to the destination-bitmap       */

/*                                                        */
/*DMAN_END----------------------------------------------- */ void combine_bitmap (byte *s_bitmap1, byte bool_op, byte *s_bitmap2)
{
    int i = 0;
    switch (bool_op)
    {
      case AND_OP:
         for (; i < bitmap_size; s_bmp1++,
             s_bmp2++, i += sizeof(byte) )
             *s_bmp2 &= *s_bmp1;
         break;

case OR_OP:
         for (; i < bitmap_size; s_bmp1++,
             s_bmp2++, i += sizeof(byte) )
             *s_bmp2 |= *s_bmp1;
         break;

case NOT_OP:
         for (; i < bitmap_size; s_bmp1++,
             s_bmp2++, i += sizeof(byte) )
             *s_bmp2 = ~*s_bmp1;
         break;
    }
    (void) clear_bits_from_lastrec(s_bmp2);
    return;
}
void clear_bits_from_lastrec(d_bmp)
{
    static uchar bmpvalue[8] =
      {0x00, 0x01, 0x03, 0x07, 0x0F, 0x1F, 0x3F, 0x7F};

long lastbyte; /*-- the lastbyte that contains the bit of --*/
                   /*-- last record number of the data file --*/
    /*------------------------------------------------------*/
    /*-- NOTE: This sample of code assume that one has linear --*/
    /*--       none segmented memory                     --*/
    /*------------------------------------------------------*/ lastbyte = numrec >> 3;
    d_bmp[lastbyte] &= bmpvalue[numrec & 7];

lastbyte++;
    for (; lastbyte < bitmap_size; lastbyte++)
        d_bmp[lastbyte] = 0;
}
```

F. Full Mode Bitmapping

As previously described, a Full Mode optimization can determine the status of each record in the data file without retrieving and examining the physical records. This optimization depends on the fact that the value of each record to be examined against the search query, the key, is sorted. Each key in the sorted storage or medium is addressed with a unique identification, such as a data file's record number. For an example of one such sorted storage implementation, the reader may wish to review the above-referenced Exploring MDXs, which describes the form of index files for dBASE®.

Employing such index files, the system can access a range of known keys with particular efficiency. Knowing the range, the records of all keys in that range are also immediately accessible. For each record found in this range, a corresponding bit in the bitmap is set. For records that are outside the range, their corresponding bits in the bitmap are reset. Thus, the bitmap is indexed knowing the status of the records.

Figure 4A:
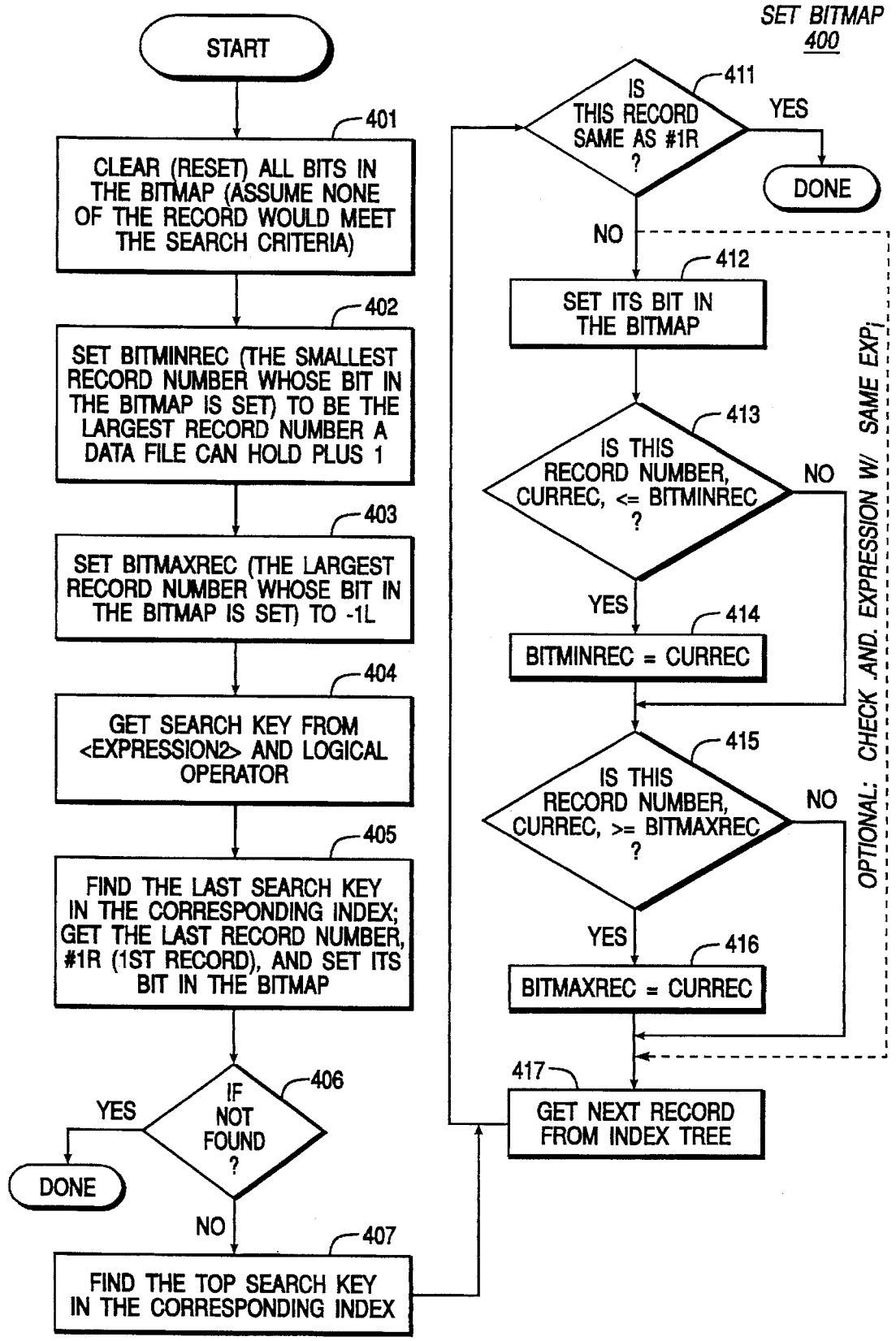
FIG. 4A is a flowchart illustrating a Full Mode method of the present invention for setting a bitmap from an index; the method does not have to repeatedly read the key expression.

Referring now to FIG. 4A, a method of the present invention for Full Mode bitmapping (setting of a bitmask) for a given Full Mode logical clause will now be described. The method is also graphically illustrated with a sample set of data in FIG. 4B, which includes a filter 431, index 433, and bitmask 435. Steps 401–403 initialize the bitmap and data structures which track the record range (i.e., filtered set). In step 401, the bitmap is cleared (e.g., by resetting all bits to zero). Thus, it is assumed at this point that none of the records would meet the search criteria. At step 402, bitminrec—the smallest record number whose bit in the bitmap is set—is initialized to the largest (theoretical) record number a data file can hold plus one (e.g., $2^{32}$ +1). At step 403, bitmaxrec—the largest record number whose bit in the bitmap is set—is initialized to −1 (default value), thus initially serving as a flag indicating that no maximum record has yet to be found.

Figure 4B:
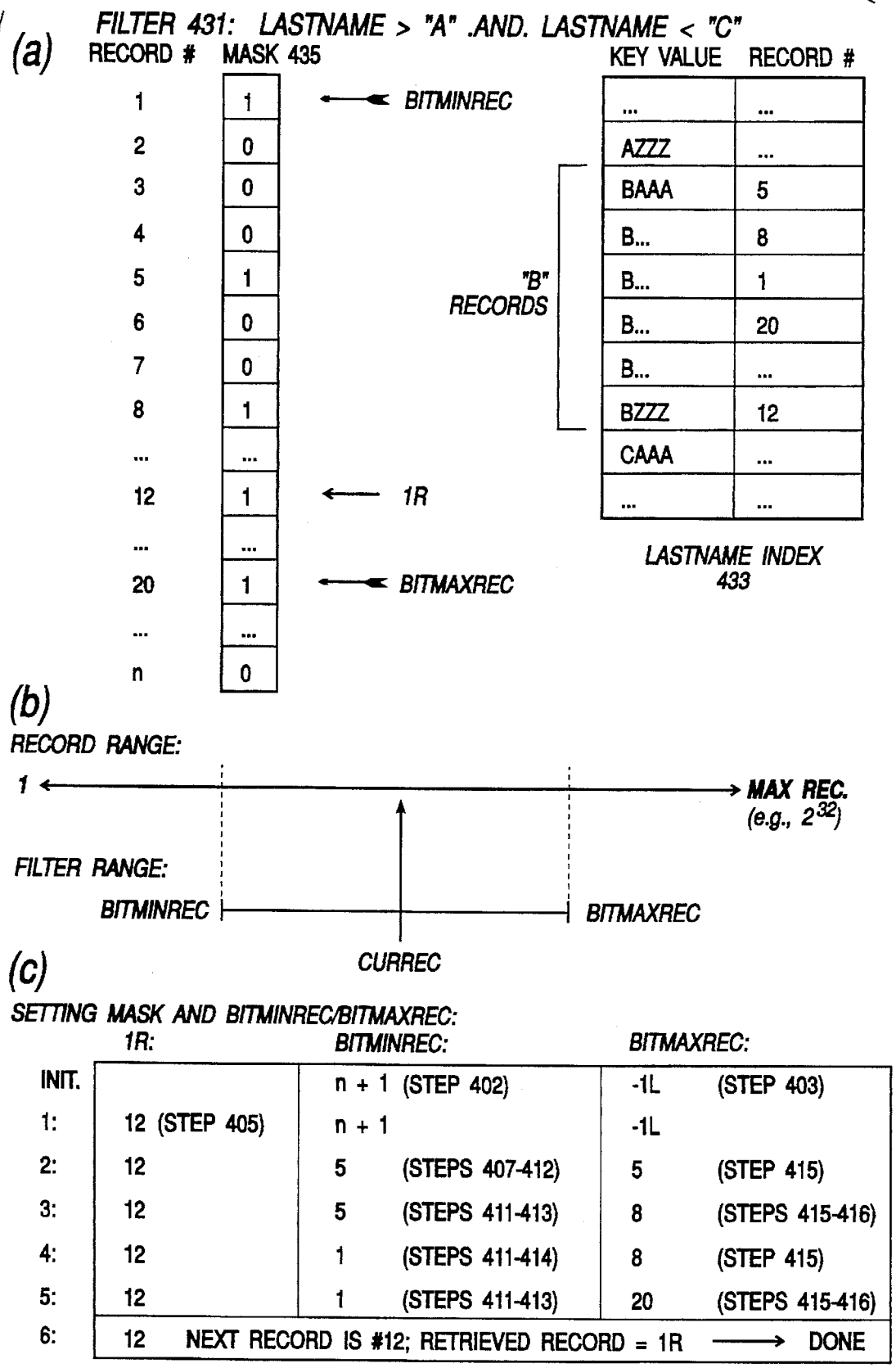
FIG. 4B is a block diagram graphically illustrating an exemplary operation of the method of FIG. 4A.

After initialization, the method proceeds to step 404 to retrieve the query expression: the key to be searched is retrieved (from the second expression) together with the logical operator. The method will now define a range which meets the query condition. Specifically, at step 405, the method finds the last search key in the index tree and retrieves its corresponding record number; the corresponding bit in the bitmap is set. For the example of FIG. 4B, the last search key meeting the filter is "BZZZ"; the corresponding record number (Record No. 12) is stored internally (as a first record or "1R" variable) for comparison at step 411. If no record is found at step 406, then the method is done as no record meeting the filter condition exists. To find the other end of the range, the method locates the top search key in the corresponding index tree at step 407. For the example at hand, the top or first search key is "BAAA" which corresponds to Record No. 5, as shown in FIG. 4B.

Having defined the two extremes (e.g., "BAAA" and "BZZZ"), the method may proceed to traverse or "walk" the index tree for determining records to "filter in" (add to the solution set). When the examination of records returns at step 411 to the 1R record (Record No. 12 for the example), all records have been examined and the method is done. Note that for the first pass through step 411, if the top search key is the same as the bottom search key (i.e., the record number for the record found in 407 is the same as the one found in step 405, then there is only one record satisfying the query condition; thus, the method is done.

If the record under exam in step 411 is not the same as 1R, the method proceeds to steps 412–417 as follows. First, the corresponding bit is set in the bitmap, thus "filtering-in" the record. Now, the method proceeds to update the minimum (bitminrec) and maximum (bitmaxrec) records of the range. At step 413, the method compares the record number of the current record (currec) meeting the condition with the previously set bitminrec value. If a current record is not greater than (i.e., is less than or equal to) the previously set bitminrec, then the method proceeds to step 414 to set bitminrec to the value of the current record (currec). Otherwise (no at step 413), the method skips step 414. In a similar manner, at steps 415 and 416 the bitmaxrec value is set. Specifically, if the record number of the current record is not less than (i.e., is greater than or equal to) bitmaxrec at step 415, then bitmaxrec is set equal to the current record number at step 416. Otherwise (no at step 415), step 416 is skipped. As shown by step 417, the method continues to traverse the index tree, retrieving the next record, and repeating the comparison of step 411 until all records meeting the filter have been found. The values assumed by bitminrec and bitmaxrec are shown in FIG. 4B for the filter 431.

As shown by the dashed line (from after step 411 to before step 417), the method may include an optional optimization before the mapping to a bitmap to identify query expressions with identical index expressions, such as in the example of LASTNAME>"A" .AND. LASTNAME<"C" (note: LASTNAME on both sides, and mutual (AND) condition). In such instances, the method may compare the key expression against the filter in one pass. Alternatively, each clause is initially treated separately (i.e., method 400 performed on each clause), thus generating a temporary solution bitmap for each; the bitmaps may then be merged or combined to generate a final solution bitmask. In the instance of a NOT. modifier being applied, the bitmap need only be inverted (i.e., 0→1, and 1→0) to yield a correct solution.

As a particular advantage of the present invention, the method does not repeatedly examine key expressions to find a matching record. The above-mentioned SYSTEM AND METHODS FOR INFORMATION RETRIEVAL, in contrast, requires repeated evaluation of the key expression (as described at looping step 64 of that reference). As key expressions may be quite long (on the order of 100 or more characters) such an approach is inefficient. The present invention instead employs a method which relies upon the fact that the index tree is sorted and, therefore, all keys within the range established by the top and bottom matched keys will satisfy the search criteria. Thus in a preferred method of the present invention, the search criteria need only be examined twice to establish the range.

G. Modifying and Appending Data

Regardless of what mode a search query has been classified, a record can be modified or added to a data file. Depending on the new values of the fields in this record, the record's status can change to be either "filtered-in" (i.e., being added to the filtered set) or "filtered-out" (i.e., being removed from the filtered set). To insure that this record takes on proper status and any dependent bitmap remains current, every time a record is modified or added to a data file, its status is examined and its representation (i.e. its uniquely indexed bit) in the bitmap is set or reset accordingly.

Figure 4C:
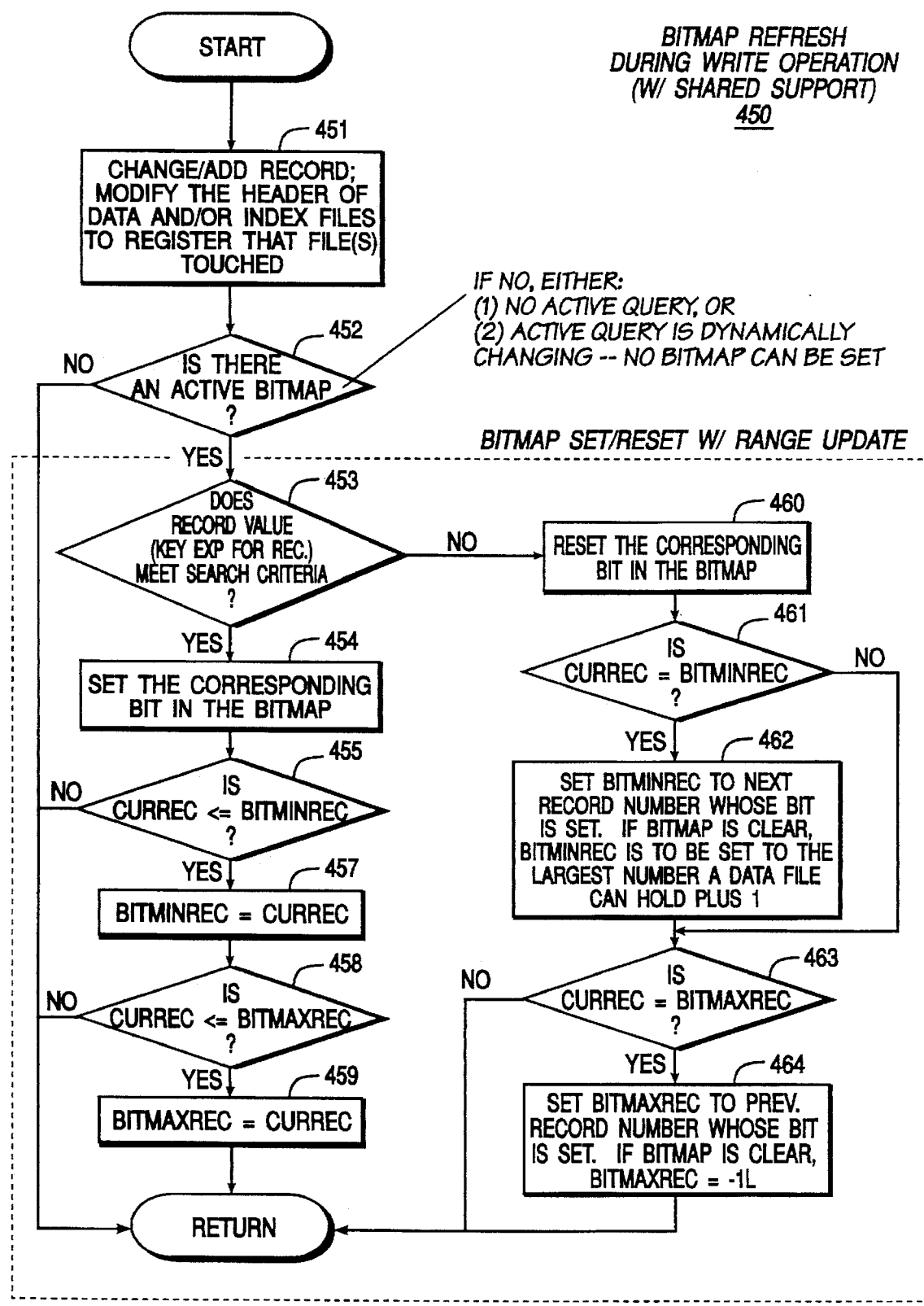
FIG. 4C is a flowchart illustrating a method of the present invention for refreshing or updating a filter bitmap during a write operation (e.g., in a multi-user or multi-tasking environment), the method including steps for determining if an underlying data file has been "touched" (e.g., record(s) modified or added).

Referring now to FIG. 4C, a method 450 of the present invention for performing bitmap refresh during the operation of writing a record will be described. The flowchart illustrates the sequence of activities to be carried out to keep both the data file and its bitmap in synchronization. The steps are as follows. Step 451 shows that if data are touched (e.g., change/add records to a database file) a flag is set (or counter is incremented) to mark the change. Thus, for the system 150 (of FIG. 1B), a modification may be tracked by modifying the header of the touched database table and/or index files. In this manner, the method may track those objects which have changed. At step 452, the method determines if there is any bitmap active and, thus, possibly in need of refreshing.

The bitmap is refreshed as follows. In step 453, if the record's value (of the record to be written) meets the filter condition (yes at step 453), then the method proceeds to step 454 to set the corresponding bit in the bitmap. It should be noted that at step 454 no comparison is made to determine whether the bit is already set; particularly, it is more computationally efficient to just set the bit (thus eliminating an additional and unneeded comparison step). Steps 455–459 update the filter range, specifically bitminrec and bitmaxrec, as was done in previously-described steps 413–416.

If the value of the record to be written does not meet the search criteria (no at step 453), then the method resets the corresponding bit in the bitmap at step 460. Again, it should be noted that for efficiency the bit is reset, regardless of its present state. Steps 461–464 test whether this current record (currec) whose bit is being reset affects the current range of filtered records. In step 461, if the current record is the same as the previously set minimum record (currec=bitminrec), then the method proceeds to step 462 to update the minimum range. Specifically, bitminrec is set to the next minimum record, that is, the next record whose bit is set. If the bitmap is clear (i.e., no next record with bit set is found), then bitminrec is set to the largest record number the data file can hold plus 1 (i.e., n+1). If the current record is not the minimum record (no at step 461), then step 462 is skipped.

At steps 463, 464, a similar determination is made whether the current record affects bitmaxrec, the maximum record of the filter range. At step 463, if the current record is equal to the maximum record (currec=bitmaxrec), then the method proceeds to step 464 to set bitmaxrec to the next highest record in the range (i.e., the previous record number whose bit is set). If the bitmap is clear (i.e., no previous record found), then bitmaxrec is set equal to −1 (clear flag). If the current record is not equal to the maximum record at step 463, then step 464 is skipped. At the conclusion of method 450, the bitmap has been refreshed for any changed or added record; the range of filtered records is also updated accordingly.

Reading Data

All the settings and resettings of the bits in the bitmap are to eliminate the unnecessary retrieval of the "filtered-out" records when the data file is scanned to extract the records that meet the search criteria. In a preferred embodiment (employing dBASE®as the DBMS), the user(s) is allowed to extract data at a very specific record (e.g., using the GOTO command), even though such data do not meet the criteria of the search query or filter imposed upon the data set. For this reason, the preferred method for data reading is different for reading a current record versus searching for next or previous record(s) that satisfy the search query.

Figure 5A:
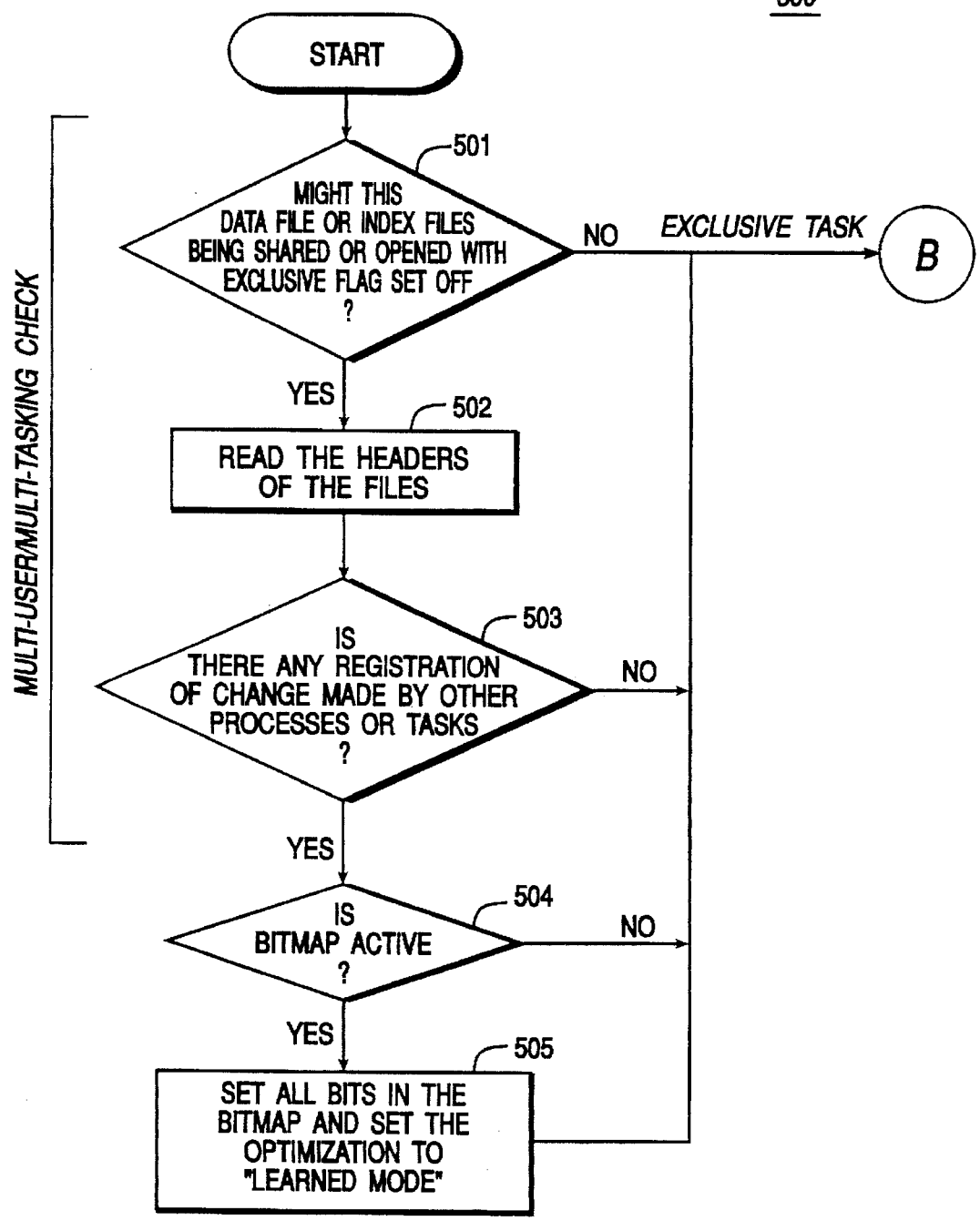
FIGS. 5A-B are flowcharts illustrating a method of the present invention for retrieving or "reading" a specific record.
Figure 5B:
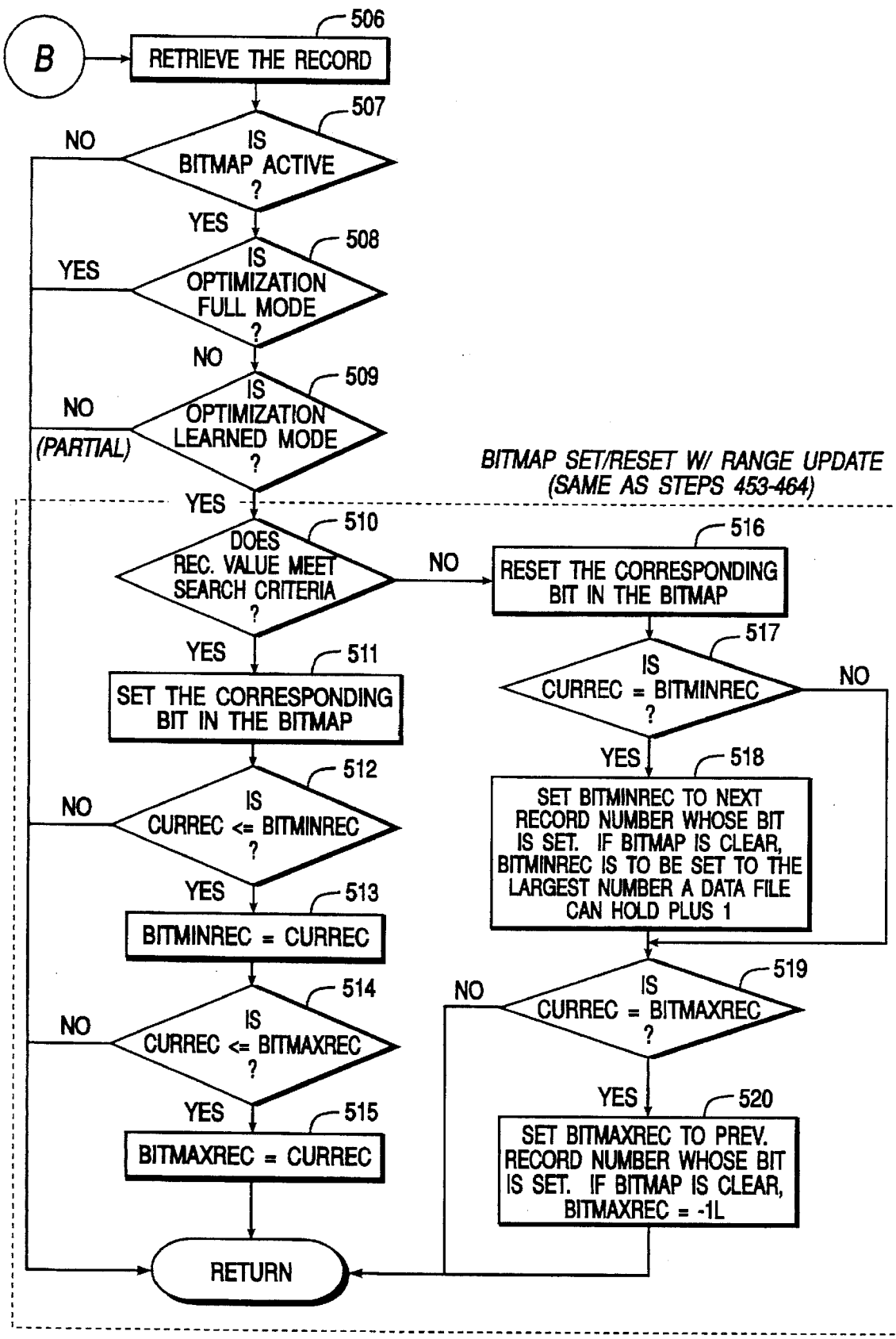

Referring now to FIGS. 5A–B, a method 500 of the present invention for retrieving/reading a specific record in a multi-user/multi-tasking (non-exclusive) environment will be described. At step 501, the method determines whether a data object(s) of interest is being shared with other users (and/or other tasks). In a preferred embodiment, data objects (e.g., database and index files) include an "exclusive" flag for indicating whether a particular data object is shared with other users (tasks) or is exclusive to this user (task). If the data object might be shared at step 501, the method proceeds to determine whether the file has been "touched" (i.e., record(s) modified or appended). Thus, at step 502, the method reads the header(s) to the file(s) of interest. If any change has been registered (e.g., by modifying the header) at step 503, then the method proceeds to step 504. At step 504, if a bitmap is active, the method proceeds to step 505 to set all bits in the bitmap (i.e., set all bits equal to 1) and the optimization mode is set to Learned Mode. The method then proceeds to step 506. As shown, in the event that the data file is not being shared (no at step 501), or no change has been registered (no at step 503), or no bitmap is active (no at step 504), then the method proceeds directly to step 506 to retrieve/read the record.

Next, beginning at step 507, the method proceeds to determine whether updating of an active bitmap is necessary. Recall that in Learned Mode, the system assumes that all records meet the filtered condition (i.e., bits are initialized to 1), but as each record is read the system "learns" the true status of a record. FIGS. 5C–D illustrate such an example. There, a filter condition 531 employs a logical function, udfCanVote—a user-defined function returning true when an individual is eligible to vote (e.g., eighteen years or older). Suppose also that the user has a database table 533 and wishes to view (browse) a small range of records as shown by the browsing window. For clarity of description, the browsing window is illustrated as a small subset of records displayed on screen. In a preferred embodiment, however, each browsing window is a virtual window of records including a subset on the order of $2^n$ records, where n equals 8, 16, or the like; for the system 100, n is 16. This allows the user to very quickly scroll among particular records of interest (e.g., by scanning up and down) within each virtual subset.

At time=$T_0$, the system initializes the bitmask for this group to 1, thus assuming initially that all records meet the condition. As shown at time=$T_1$, as each record is actually read, the system "learns" which records truly meet the filter condition. As shown at $T_1$, two records (Babbet and Bates) are filtered out since, upon reading, the system learns that they do not meet the filter condition.

Continuing with the example, suppose that the user now instructs the system to jump (e.g., GOTO) to a record out of range (e.g., Record No. 70,000), thus moving to a new browsing window. As shown at time=$T_2$, the system again assumes that the records of the new window meet the filter condition and, thus, initializes the corresponding bits to 1. As the records are actually read at time=$T_4$, however, the system again "learns" that certain records do not truly meet the filter condition; these records are filtered out and hence not displayed to the user.

Finally, as shown by FIG. 5D, the user may instruct the system to jump back to a subset of records which has already been "learned." As shown at time=$T_4$, the system need only apply the previously-learned bitmask for rapidly retrieving the information of interest. By applying Learned Mode optimization, therefore, the system of the present invention may optimize data access for conditions which are not otherwise optimizable (by indexing).

Returning now to step 507 of the method 500 (of FIGS. 5A–B), the steps of updating bitmaps while retrieving records will now be described. At that step, the method 500 determines whether any bitmaps are active. If not (no at step 507), then no bitmap updating is necessary and the method may return. At step 508, the method determines whether the current optimization is Full Mode. With Full Mode optimization, the system knows that the active bitmap(s) is not dynamically changing and/or will not be modified by other users. Thus, the method may simply return when optimization is Full Mode (yes at step 508), since it is known that the bitmap does not require updating. Similarly, if optimization is not Learned Mode (i.e., it is Partial Mode) at step 509, then the method may return as the bitmap does not require updating. At steps 510–520, the method proceeds to update the bitmap and range in a manner similar to that which was done for steps 453–464 of FIG. 4C.

Figure 6A:
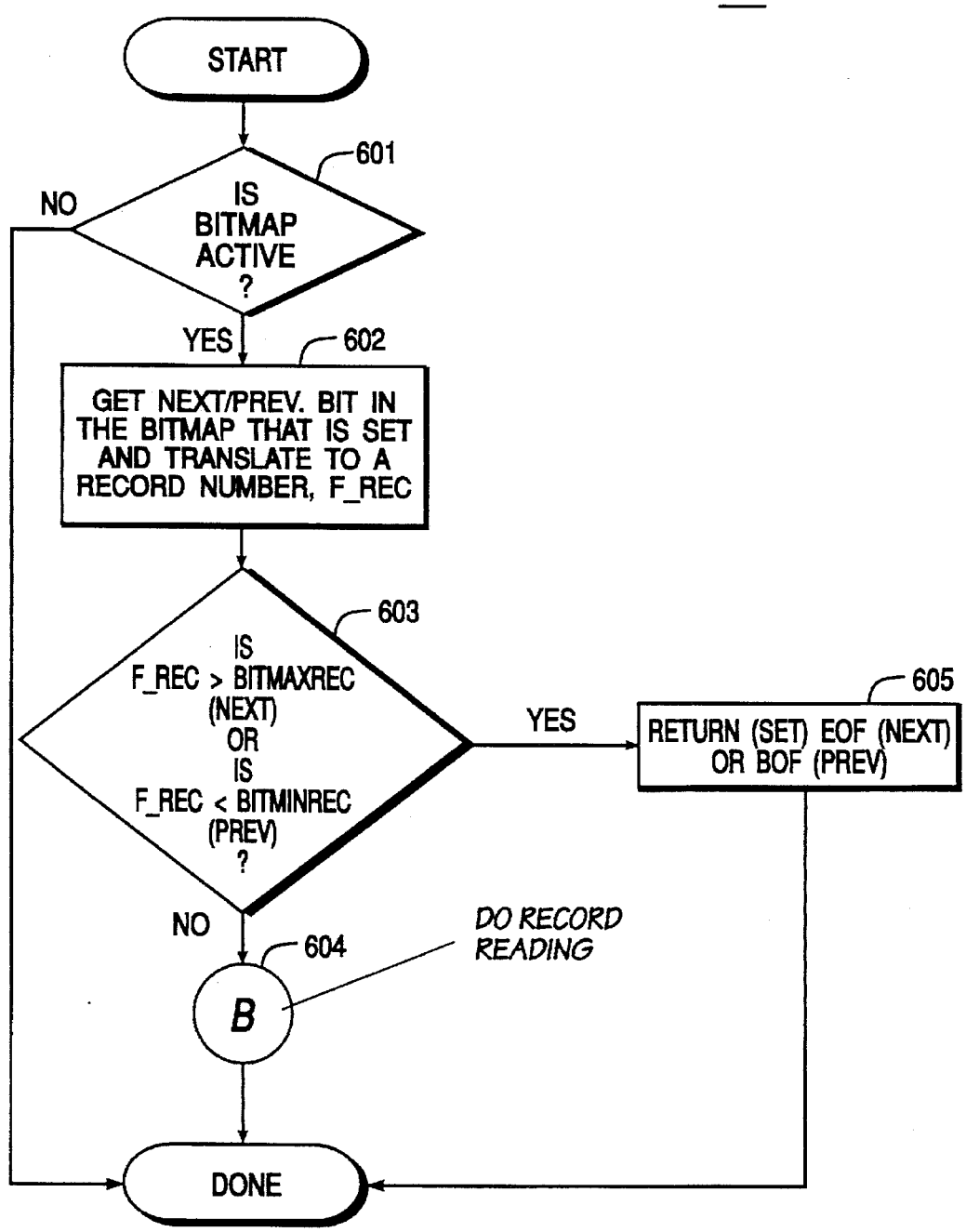
FIG. 6A is a flowchart illustrating a method of the present invention for navigating records (e.g., "browsing") in natural order with a filter active.
Figure 6B:
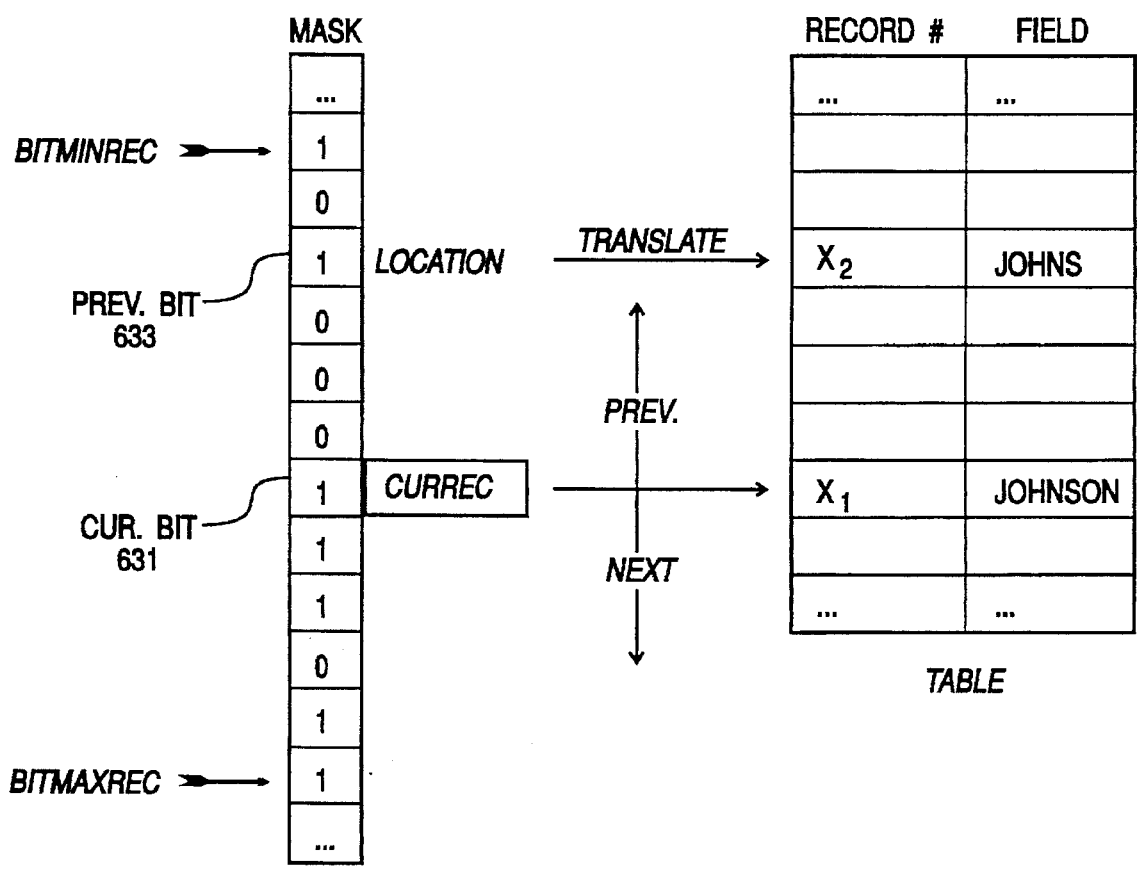
FIG. 6B is a diagram illustrating exemplary operation of the method of FIG. 6A.
Figure 7:
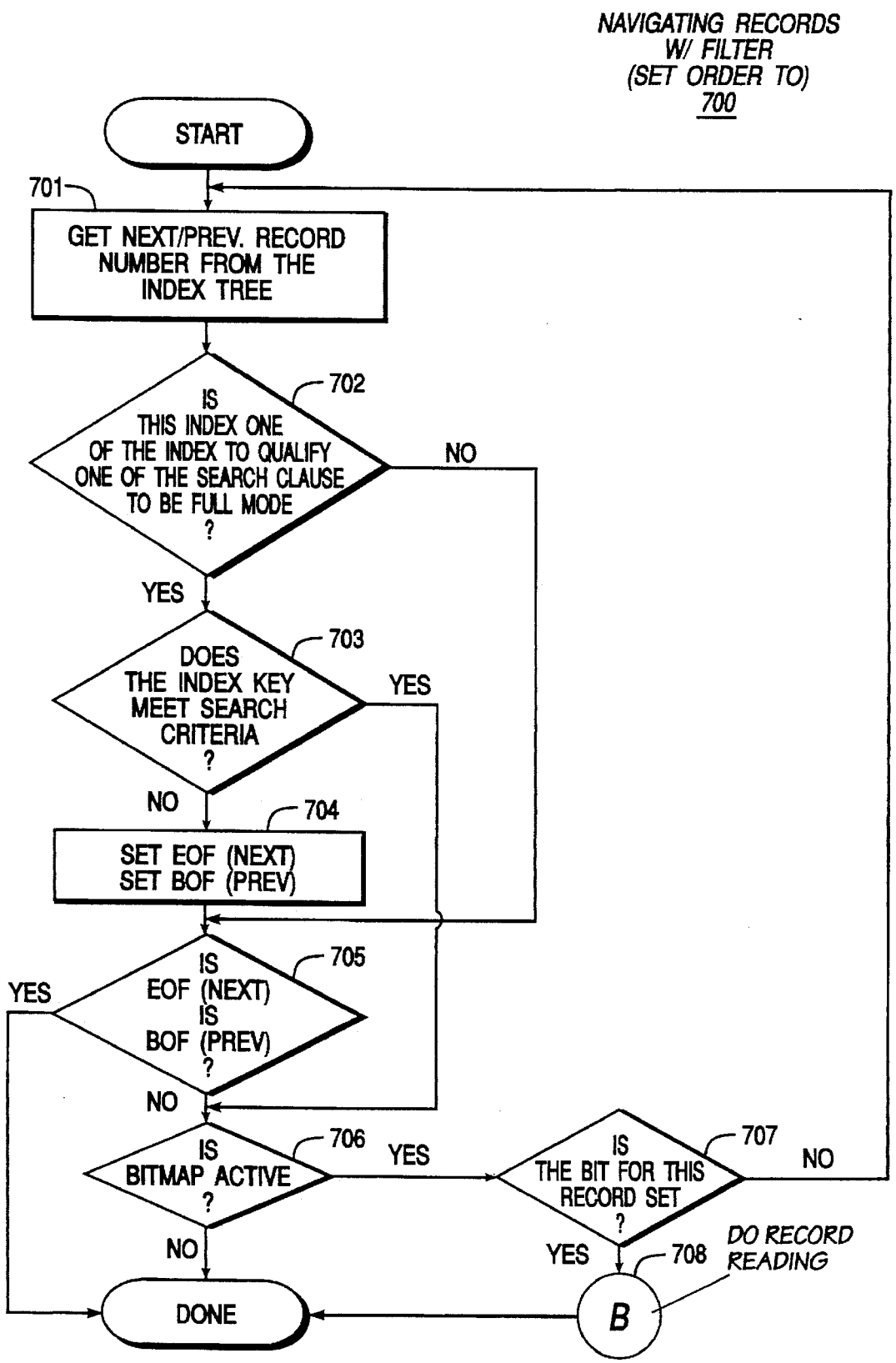
FIG. 7 is a flowchart illustrating a method of the present invention for navigating records (e.g., "browsing") in a user-specified order with a filter active.

FIGS. 6–7 illustrate methods 600, 700 of the present invention for navigating records (i.e., reading a next or a previous record) in natural order or index order, respectively. At step 601 of FIG. 6A, the method 600 determines if a bitmap is active. If one is active (yes at step 601), then the method may employ the bitmap for retrieving the next or previous record. At step 602, the method locates the next or previous bit in the bitmap and translates that bit into a corresponding record number (F_REC). For the scenario 630 of FIG. 6B, for example, the current rec (currec) is $X_1$; this corresponds to a current bit location 631. Thus, the previous bit for this scenario is prev. bit 633, which translates into record number $X_2$. At step 603, if the record number (F_REC) is out of range, that is, greater than bitmaxrec (for "next" operation) or is less than bitminrec (for "prev." operation), the method returns End-of-File (EOF) or Beginning-of-File (BOF), respectively, at step 605. Otherwise (no at step 603), the method proceeds to read the record at step 604 (by repeating steps 506–520 of FIG. 5B). At the conclusion of these steps, the method is done (or can loop to step 602 for skipping to the next or previous record desired).

Referring now to FIG. 7, a method 700 of the present invention for navigating records with the underlying table adhering to a particular index order (e.g., SET ORDER TO) and a filter condition in place is illustrated. Such a situation would occur, for instance, with a filter set to NAME (e.g., SET FILTER TO NAME>"SMITH"), but an index order on AGE (e.g., SET ORDER TO AGE). In general, the method is similar to method 600. However, method 700 is modified to take into account the order effected by the index (of SET ORDER TO); this is done by locating next and prev. records in the index tree (as opposed to the bitmap).

The method proceeds as follows. At step 701, the method determines the next or prev. record number from the index tree (which has been employed for setting the order). In step 702, the method determines whether this index is also one used to qualify one of the search clauses of the query to be Full Mode. If so (yes at step 702), then the method proceeds to step 703 to determine if the index key meets the search criteria. If not (no at step 703), the method sets the flag to End-of-File (EOF) for "next" operations, or sets it to Beginning-of-File (BOF) for "prev." operations. In the event that the index is not one used to qualify one of the search clauses to be Full Mode in step 702, steps 703 and 704 are skipped. In the event that the index key does meet the search criteria (yes at step 703), the method skips down to step 706.

At step 705, the method tests whether the "EOF" flag has been tripped for "next" operations, or the "BOF" flag has been tripped for "prev." operations. If yes, then the requested operation has reached the end of the filtered range; the method has concluded and may return. Otherwise (no at step 705), the method proceeds to step 706 to determine if there is an active bitmap. If a bitmap is active (yes at step 706) and the bit for this record is set (meets the condition) at step 707, then the method proceeds to step 708 (where the record reading steps of FIG. 5B are repeated), after which the method concludes. If, on the other hand, the bit is not set for this record (no at step 707), then the record does not meet the filter condition and the method may loop back to step 701 to repeat the process.

While the invention is described in some detail with specific reference to a single preferred embodiment and certain alternatives, there is no intent to limit the invention to that particular embodiment or those specific alternatives. Thus, the true scope of the present invention is not limited to any one of the foregoing exemplary embodiments but is instead defined by the following claims.

What is claimed is:

1. In a system for storing information as a plurality of data records on a storage device and for reading into a memory data records which are of interest to a user, a method for providing access to particular data records which is of interest to the user, the method comprising:

(a) specifying at least one criterion for filtering out records which are not of interest to the user, wherein said at least one criterion includes a condition such that records satisfying said at least one criterion cannot be determined by the system from an existing index of the data records;

(b) learning on-the-fly which records satisfy said at least one criterion as each record is first read from said storage device by:

(i) providing a bitmask comprising a plurality of bits, each bit corresponding to a single record of the data records, and each bit having a first state for indicating that a record satisfies said at least one criterion and a second state for indicating that a record does not satisfy said at least one criterion;

(ii) setting all of the bits to said first state, wherein said system initially assumes that all records satisfy said at least one criterion so that none of the records are filtered out which have yet to be read into said memory;

(iii) receiving a request for a desired range of records from the data records;

(iv) reading each record of the desired range into said memory whose bit is set to the first state and applying said at least one criterion as each record is read for determining whether the record being read actually satisfies said at least one criterion;

(v) for each record read in step (iv) which does not satisfy said at least one criterion, setting its corresponding bit to the second state for filtering out the record; and (c) providing access to each record of the desired range which has not been filtered out as said each record of the desired range currently resides in said memory.

2. The method of claim 1, further comprising:

(d) receiving at least one new request for access to a different desired range of records from the data records; and (e) repeating steps (a)–(c) for each new request, with the different desired range as said desired range.

3. The method of claim 2, further comprising:

(f) receiving a request to return to a previously requested range, said previously requested range comprising previously-requested records which are no longer in raid memory; and (g) repeating steps (b) and (c) wherein records determined to not satisfy said at least one criterion in a previous pass of step (b) are not re-read.

4. The method of claim 1, wherein said first state has a value of logical 1 and said second state has a value of logical 0.

5. The method of claim 1, wherein said at least one criterion includes a condition which requires reading a record from said storage device for determining whether the record satisfies the at least one criterion.

6. The method of claim 1, wherein said at least one criterion includes a condition which cannot be determined by the system from an existing index of the data records.

7. An information retrieval system comprising:

a computer having a processor, a memory, and a storage device;

means for storing information as a plurality of data records on said storage device;

query means for receiving user input specifying a filter condition, for indicating particular information in said data records which is of interest to a user;

means for maintaining a bitmask comprising a plurality of bits, each bit for indicating that a particular data record satisfies the filter condition;

means for setting all bits in said bitmask to indicate that all data records initially satisfy the filter condition;

means for receiving user input requesting access to a first range of records from said plurality of data records and for retrieving from said storage device each record in said first range of records;

means for dynamically adjusting the bitmask as each record of the first range is retrieved, by comparing each data record of the first range retrieved from said storage device against the filter condition and resetting the bit which corresponds to any data record retrieved for the first range which does not satisfy the filter condition;

means for receiving user input requesting access to a second range of records from said plurality of data records and for retrieving from said storage device each record in said second range of records;

means for dynamically adjusting the bitmask as each record of the second range is retrieved, by comparing each data record of the second range retrieved from said storage device against the filter condition and resetting the bit which corresponds to any data record retrieved for the second range which does not satisfy the filter condition; and means for receiving user input again requesting access to said first range of records from said plurality of data records and for retrieving from said storage device only those records in said first range of records whose corresponding bits have not been reset.

8. The system of claim 7, wherein bits which have been set store a value of logical 1 and bits which have been reset store a value of logical 0.

9. The system of claim 7, wherein said filter condition includes a condition which requires retrieval of a record before determination can be made as to whether the record satisfies said filter condition.

10. The system of claim 7, wherein said filter condition includes a condition which cannot be determined by the system from an existing index of the data records.

* * * * *